United States Patent
Yamasaki

(10) Patent No.: US 10,627,834 B2
(45) Date of Patent: Apr. 21, 2020

(54) AIRCRAFT CONTROL DEVICE, AIRCRAFT, AND METHOD FOR COMPUTING AIRCRAFT TRAJECTORY

(71) Applicant: MITSUBISHI HEAVY INDUSTRIES, LTD., Tokyo (JP)

(72) Inventor: Koichi Yamasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/561,645

(22) PCT Filed: Jul. 11, 2016

(86) PCT No.: PCT/JP2016/070413
§ 371 (c)(1),
(2) Date: Sep. 26, 2017

(87) PCT Pub. No.: WO2017/014085
PCT Pub. Date: Jan. 26, 2017

(65) Prior Publication Data
US 2018/0074524 A1    Mar. 15, 2018

(30) Foreign Application Priority Data

Jul. 17, 2015  (JP) ................. 2015-143183

(51) Int. Cl.
*G05D 1/12*  (2006.01)
*B64C 19/02*  (2006.01)
(Continued)

(52) U.S. Cl.
CPC ............. *G05D 1/12* (2013.01); *B64C 19/02* (2013.01); *F41G 9/002* (2013.01); *F41H 13/00* (2013.01);
(Continued)

(58) Field of Classification Search
CPC .................................................. F41G 9/002
See application file for complete search history.

(56) References Cited

U.S. PATENT DOCUMENTS

2004/0068351 A1  4/2004 Solomon
2008/0039987 A1  2/2008 Winkler et al.
(Continued)

FOREIGN PATENT DOCUMENTS

JP  2004-25966   1/2004
JP  2012-179984  9/2012
(Continued)

OTHER PUBLICATIONS

International Search Report dated Sep. 20, 2016 in International (PCT) Application No. PCT/JP2016/070413, with English translation.
(Continued)

*Primary Examiner* — Imran K Mustafa
(74) *Attorney, Agent, or Firm* — Wenderoth, Lind & Ponack, L.L.P.

(57) ABSTRACT

An aircraft control device calculates trajectories of multiple aircraft that is member of a flight by use of a method such as Direct Collocation with Nonlinear Programming (DCNLP), in which an optimal solution is obtained by discretizing continuous variables. Nodes indicating the trajectory are calculated and set by substituting a discretized control variable of the aircraft into an aircraft equation of motion, or by use of other methods. Instead of calculating the trajectory of the aircraft as a continuous problem, discretisation reduces the calculation amount and time required for the trajectory calculation. The aircraft control device then determines, from among trajectories satisfying constraints corresponding to the role of the aircraft, an optimal trajectory based on an evaluation value obtained by an objective function corresponding to the role. Accordingly,
(Continued)

the aircraft control device can calculate a more optimal trajectory corresponding to the role of the aircraft in a shorter time.

10 Claims, 17 Drawing Sheets

(51) Int. Cl.
    *F41H 13/00*     (2006.01)
    *F41G 9/00*     (2006.01)
    *G05D 1/00*     (2006.01)
    *G05D 1/10*     (2006.01)
    *F41G 7/30*     (2006.01)
    *F41G 7/24*     (2006.01)

(52) U.S. Cl.
    CPC ......... *G05D 1/0005* (2013.01); *G05D 1/0094* (2013.01); *G05D 1/104* (2013.01); *G05D 1/107* (2013.01); *F41G 7/24* (2013.01); *F41G 7/30* (2013.01)

(56) References Cited

U.S. PATENT DOCUMENTS

| | | | | |
|---|---|---|---|---|
| 2009/0118896 A1* | 5/2009 | Gustafsson | ............ | G05D 1/104 701/31.4 |
| 2010/0198514 A1* | 8/2010 | Miralles | ................. | F41G 7/008 701/302 |
| 2015/0234388 A1 | 8/2015 | Yamasaki | | |
| 2015/0332490 A1* | 11/2015 | Coulmeau | ............ | G06T 11/206 701/3 |

FOREIGN PATENT DOCUMENTS

| | | |
|---|---|---|
| JP | 5306051 | 10/2013 |
| JP | 2014-129996 | 7/2014 |
| WO | 2014/083993 | 6/2014 |

OTHER PUBLICATIONS

Extended European Search Report dated Dec. 20, 2017 in European Application No. 16827646.7.
Written Opinion of the International Searching Authority dated Sep. 20, 2016 in International (PCT) Application No. PCT/JP2016/070413.
Yokoyama, Nobuhiro et al., "Decentralized Flight Trajectory Planning of Multiple Aircraft", JAXA Special Publication, Proceedings of Lectures and Workshop International-Recent Advances in Multidisciplinary Technology and Modeling, Japan Aerospace Exploration Agency, Feb. 2008, pp. 88-97.
Geiger, Brian, "Unmanned Aerial Vehicle Trajectory Planning with Direct Methods", A Dissertation in Aerospace Engineering, The Pennsylvania State University, Aug. 2009, pp. 13-17.
Raivio, T. et al., "Aircraft trajectory optimization using nonlinear programming", in "System Modelling and Optimization", 1996, pp. 435-441.

\* cited by examiner

AIRCRAFT CONTROL DEVICE, AIRCRAFT, AND METHOD FOR COMPUTING AIRCRAFT TRAJECTORY

TECHNICAL FIELD

The present invention relates to an aircraft control device, an aircraft, and a method for computing an aircraft trajectory.

BACKGROUND ART

Fire control needs to be performed efficiently when multiple aircraft shoot a target or search and track a target for shooting.

Hence, a control device has been developed which determines the most efficient or advantageous combination of friendly aircraft, role, target, and trajectory. This control device is included is an aircraft, for example, to transmit the aforementioned determination result to accompanying aircraft that is member of a flight, through a network, and displays the result on an MFD (Multi Function Display) or the like of each of the accompanying aircraft. The role mentioned above refers to shooting of a guided missile, searching and tracking of a target, and guiding of a guided missile, for example.

For example, PTL 1 discloses an aircraft control device that uses an air combat trajectory program (also referred to as "air combat maneuver program"), to determine, on the basis of a positional relation between an aircraft and a target aircraft, a role that each aircraft plays toward the target aircraft, and a trajectory of each aircraft based on a control operation assigned according to the role of the aircraft. The aircraft control device then calculates a role determination evaluation value based on a prediction result of a trajectory of the aircraft and a trajectory of the target aircraft, determines an aircraft role having the maximum evaluation value as the role of the aircraft, and determines an aircraft trajectory based on the determined role as the trajectory of the aircraft.

CITATION LIST

Patent Literature

{PTL 1}
Japanese Unexamined Patent Application, Publication No. 2014-129996

SUMMARY OF INVENTION

Technical Problem

The air combat trajectory program described above determines the aircraft trajectory on the basis of an operation database previously generated from a pilot's empirical rule and the like. The aircraft trajectory acquired in the end includes the pilot's empirical rule, which is a human factor whose correctness is hard to evaluate, and therefore may not be the optimal solution. The solution of the assigned role calculated on the premise of the air combat trajectory program also may not be the optimal solution.

Since the trajectory and role of an aircraft need to be determined while a target aircraft is moving together with the aircraft and accompanying aircraft, the optimal solution needs to be acquired in a short time.

The present invention has been made in view of the foregoing, and aims to provide an aircraft control device, an aircraft, and a method for computing aircraft trajectory that require less time to calculate a more optimal trajectory corresponding to a role of an aircraft.

Solution to Problem

To solve the above problem, an aircraft control device, an aircraft, and a method for computing aircraft trajectory of the present invention adopt the following solutions.

An aircraft control device of a first aspect of the present invention is an aircraft control device that calculates trajectories of multiple aircraft that is member of a flight, by using a calculation method in which an optimal solution is obtained by discretizing a continuous variable, the aircraft control device including a trajectory determination means that calculates discrete points indicating the trajectory by substituting a discretized control variable of the aircraft into an equation of motion of the aircraft, and determines, from among the trajectories that satisfy a constraint corresponding to a role of the aircraft, as optimal trajectory based on an evaluation value obtained by an objective function corresponding to the role.

The aircraft control device of this configuration calculates trajectories of multiple aircraft that is member of a flight. For this reason, a calculation method such as Direct Collocation with Nonlinear Programming (DCNLP) is used, in which an optimal solution is obtained by discretizing a continuous variable.

A trajectory determination means calculates discrete points indicating the trajectory of the aircraft, by substituting a discretized control variable of the aircraft into an equation of motion of the aircraft. Instead of substituting the control variable into the equation of motion, other appropriate methods may be used to set the initial solution of discrete points. Instead of calculating the trajectory of the aircraft as a continuous value, discretization can reduce the amount of calculation, and reduce the time of trajectory calculation.

Then, discrete points satisfying a constraint corresponding to the role of the aircraft is determined as the trajectory of the aircraft. Roles of the aircraft are shooting of a guided missile (the role of shooting a guided missile is also referred to as shooter), searching and tracking of a target (the role of searching and tracking of a target is also referred to as a sensor), and guiding of the guided missile (the role of guiding the guided missile is also referred to as a guider), for example, and constraints are predetermined according to the roles. Of the aircraft trajectories satisfying the constraints, an optimal trajectory is determined based on an evaluation value obtained by an objective function (evaluation function) corresponding to the role.

As has been described, this configuration enables calculation of a more optimal trajectory corresponding to the role of the aircraft in a shorter time, by using a calculation method in which an optimal solution is obtained by discretizing a continuous variable.

In the above first aspect, a variable may be assigned to each of the objective function and the constraint corresponding to the role; and the aircraft control device may include a role determination means that determines a value of the variable for every objective function and every constraint, such that the objective function and the constraint that do not correspond to the assigned role of the aircraft are invalidated.

According to this configuration, a variable is assigned to each of the objective function and the constraint corresponding to the role. The variable is provided to invalidate objective functions and constraints that do not correspond to the assigned role of the aircraft. Assignment refers to multiplication of the objective function and the constraint by the variable, for example.

The role determination means determines a value of the variable for every objective function and every constraint, such that objective functions and constraints that do not correspond to the assigned role of the aircraft are invalidated. The invalidated objective functions and constraints are kept from affecting calculation of the trajectory of the aircraft. Hence, the trajectory is calculated based only on the objective function and constraints that are not invalidated.

In this configuration, the trajectory of the aircraft is calculated every time the role of the aircraft, that is, the invalidated objective functions and constraints are varied, and the result is evaluated. Thus, the optimal role and trajectory of the aircraft can be determined concurrently.

In the above first aspect, the variable may be any one of 1 and 0.

According to this configuration, objective functions and constraints that do not correspond to the assigned role of the aircraft can be easily invalidated.

In the above first aspect, the objective function and the constraint configured of an equation may be multiplied by the variable.

According to this configuration, unnecessary objective functions and equality constraints can be easily invalidated.

In the above first aspect, the variable may be assigned such that if the variable of the constraint configured of an inequality is set to 0, the inequality always holds.

According to this configuration, unnecessary objective functions and inequality constraints can be easily invalidated.

In the above first aspect, the objective function may include a function for calculating a distance between the aircraft and a target.

According to this configuration, an optimal trajectory can be determined according to the positional relation between the aircraft and the target.

In the above first aspect, if a role of the aircraft is searching and tracking of a target, the constraint may be to constantly acquire and track the target within a coverage area of a radar. Also, if a role of the aircraft is guiding of a guided missile, the constraint may be to constantly acquire and track the target within a coverage area of a guidance radio wave.

According to this configuration, an optimal trajectory corresponding to the role of the aircraft can be determined.

In the above first aspect, if a role of the aircraft is shooting of a guided missile, the constraint may be that a nose of the aircraft is pointed toward the target when the guided missile is shot, and that the target is within a range of the guided missile when the guided missile is shot.

According to this configuration, an optimal trajectory corresponding to the role of the aircraft can be determined.

An aircraft of a second aspect of the present invention includes the aircraft control device described above.

A method for computing aircraft trajectory of a third aspect of the present invention is a method for computing aircraft trajectory that calculates trajectories of a plurality of aircraft that is member of a flight, by using a calculation method in which an optimal solution is obtained by discretizing a continuous variable, including the steps of: calculating discrete points indicating the trajectory by substituting a discretized control variable of the aircraft into an equation of motion of the aircraft; and determining, from among the trajectories that satisfy a constraint corresponding to a role of the aircraft, an optimal trajectory based on an evaluation value obtained by an objective function corresponding to the role.

Advantageous Effects of Invention

The present invention has an advantageous effect of calculating a more optimal trajectory corresponding to a role of an aircraft in a shorter time.

DESCRIPTION OF EMBODIMENTS

Hereinafter, an embodiment of an aircraft control device, an aircraft, and a method for computing an aircraft trajectory will be described with reference to the drawings.

Figure 1:
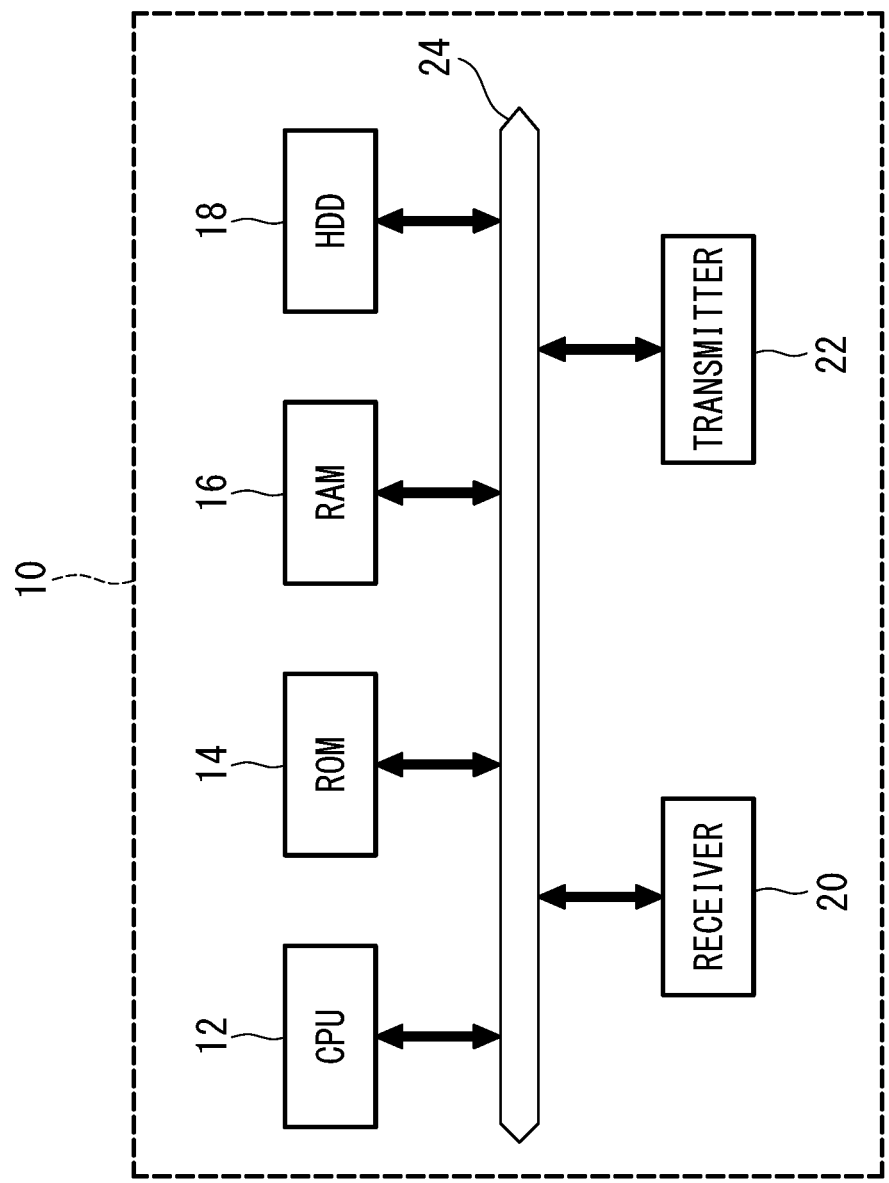
FIG. 1 is a block diagram illustrating an electrical structure of an aircraft control device of an embodiment of the present invention.

FIG. 1 is a block diagram illustrating an electrical structure of an aircraft control device 10 of the embodiment. The aircraft control device 10 of the embodiment is a device that obtains roles of multiple aircraft 40 (see FIG. 2) that is member of a flight, and obtains trajectories of the aircraft 40. The aircraft control device 10 is included in the aircraft 40. In the following description, the aircraft 40 that is member of a flight is also referred to as a friendly aircraft, and a target aircraft 42 is also referred to as an enemy aircraft.

The aircraft control device 10 of the embodiment includes a CPU (Central Processing Unit) 12 that executes various operation processing, a ROM (Read Only Memory) in which various programs executed by the CPU 12 and various information are stored beforehand, a RAM (Random Access Memory) 16 that is used as a work area, for example, when the CPU 12 executes various programs, and an HDD (Hard Disk Drive) 18 as a storage means that stores various information such as airframe data and the like of the aircraft. 40 targeted for the various programs and simulations.

The CPU 12, ROM 14, RAM 16, HDD 18, receiver 20, and transmitter 22 are electrically connected to one another through a system bus 24.

The aircraft control device 10 includes: the receiver 20 that receives, from accompanying aircraft, various information such as accompanying aircraft information and information (target aircraft information) on the target aircraft 42 (see FIG. 2) acquired from searching and tracking by the accompanying aircraft; and the transmitter 22 that transmits, to accompanying aircraft, a result of operation by the CPU 12 and self-information. Accompanying aircraft information includes positional information on accompanying aircraft, the velocity of accompanying aircraft, and other data. Self-information includes the aircraft's own positional information, own velocity, and other data. Target aircraft information includes positional information on the target aircraft 42, the velocity of the target aircraft 42, and other data.

Thus, the aircraft 40 of the embodiment is capable of transmitting and receiving (datalink) various information among the aircraft 40. In other words, the aircraft 40 form a network by datalink to share various information such as self-information, accompanying aircraft information, target aircraft information, and information to instruct other aircraft 40.

Figure 2:
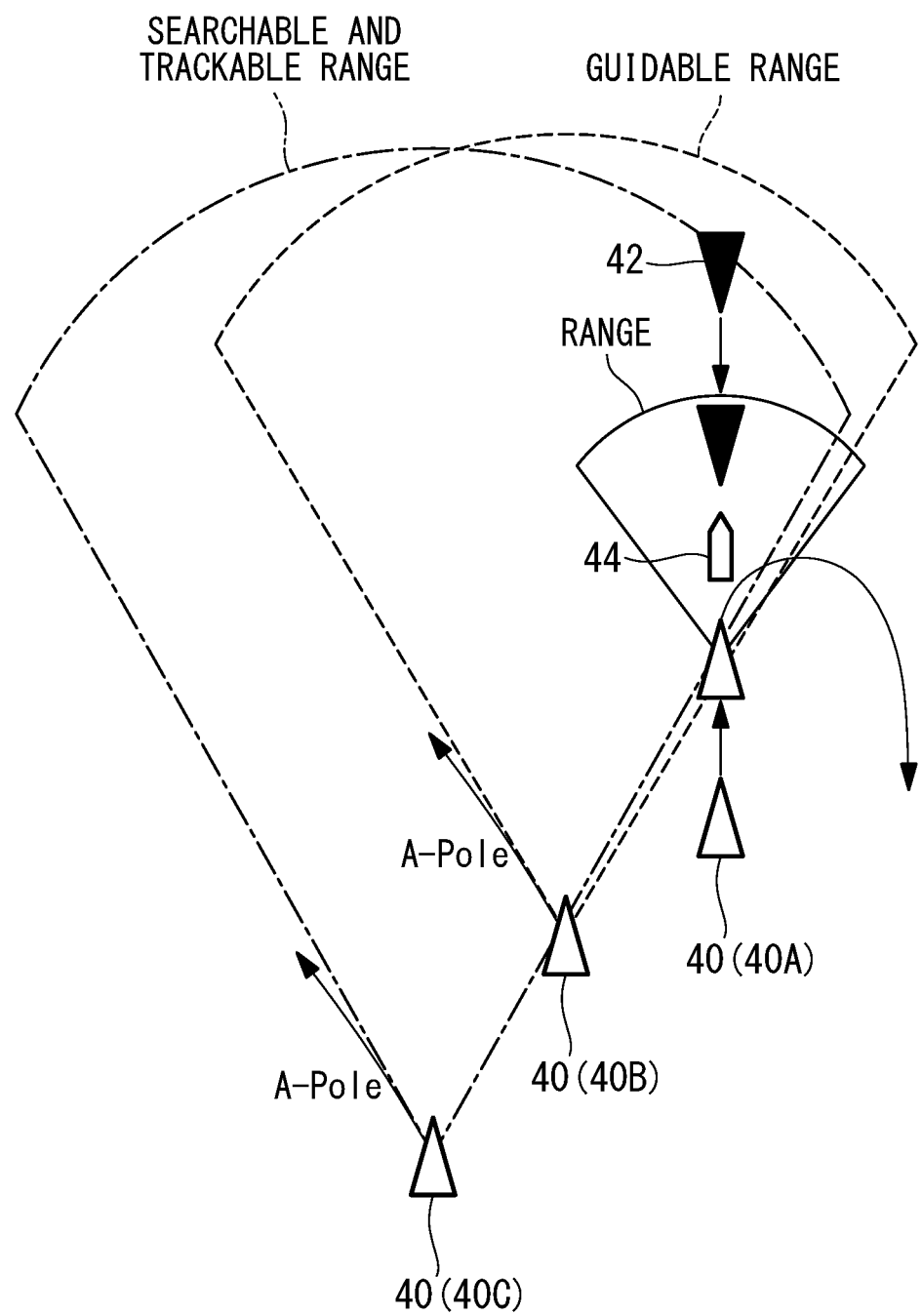
FIG. 2 is a schematic diagram illustrating roles and trajectories of aircraft of the embodiment of the present invention.

FIG. 2 is a schematic diagram illustrating roles and trajectories of the aircraft 40 of the embodiment. Although only one target aircraft 42 is shown as an example in FIG. 2, the number of target aircraft 42 may be two or more. FIG. 2 is an example of an MRM (Medium Range Missile) combat, is which the target aircraft 42 is so far away from the aircraft 40 that it is not visually recognizable.

The aircraft 40 is capable of shooting (shooter) a guided missile (missile) 44 toward the target aircraft 42, guiding (guider) the guided missile 44, and searching and tracking (sensor) the target aircraft 42.

That is, roles of the aircraft 40 are searching and tracking the target aircraft 42, guiding the guided missile 44, and shooting the guided missile 44, for example. Guiding the guided missile 44 may refer to guiding of the guided missile 44 shot by the aircraft 40 itself, or guiding of the guided missile 44 shot by an accompanying aircraft. In FIG. 2, the role of an aircraft 40A (shooter 40A) is to shoot the guided missile 44, the role of an aircraft 40B (guider 40B) is to guide the guided missile 44, and the role of an aircraft 40C (sensor 40C) is to search and track the target aircraft 42, for example.

In the example of FIG. 2, the range narrows in the order of a searchable and trackable range of the aircraft 40, a guidable range of the guided missile 44, and the range of the guided missile 44.

As shown in FIG. 2, when the aircraft 40 and the target aircraft 42 are flying opposite to each other, it is preferable that the shooter 40A face the target aircraft 42 (nose-to-nose state, so-called head-on state), so that the range of the guided missile 44 is maximized and the aircraft 40 can shoot at a point distant from the target aircraft 42. Meanwhile, it is preferable that the guider 40B be positioned such that it can acquire and track the target aircraft 42 and the guided missile 44 near the edge of the guidable range. It is preferable that the sensor 40C be positioned such that it can acquire and track the target aircraft 42 near the edge of the searchable and trackable range. This minimizes the range of the target aircraft 42, and allows the aircraft 40 to quickly break away from the range of the target aircraft 42 even if it approaches the range.

Next, a sequential role and trajectory that each aircraft 40 takes toward the target aircraft 42 will be described with reference to FIG. 2.

The sensor 40C searches and tracks the target aircraft 42, and transmits information on the position and velocity of the target aircraft 42 to the shooter 40A and the guider 40B. The shooter 40A shoots the guided missile 44 toward the target aircraft 42, when the target aircraft 42 enters the range of the guided missile 44. Entry of the target aircraft 42 into the range of the guided missile 44 of the shooter 40A means that the shooter 40A may have entered the range of the target aircraft 42. For this reason, the shooter 40A turns around and breaks away from the target aircraft 42, immediately after shooting the guided missile 44. Since the shooter 40A having shot the guided missile 44 thus cannot guide the guided missile 44, the guider 40B guides the guided missile 44 shot by the shooter 40A.

The guider 40B follows the so-called A-Pole maneuver, in which the guider 40B evades the target aircraft 42, while guiding the guided missile 44 by acquiring and tracking the guided missile 44 near the edge of the guidable range. The sensor 40C also follows the A-pole maneuver, in which the sensor 40C evades the target aircraft 42, while searching and tracking the target aircraft 42 near the searchable and trackable range.

The trajectory of the aircraft 40 is thus determined according to the role that each aircraft 40 plays toward the target aircraft 42.

Next, a description will be given of calculation (hereinafter referred to as "optimal trajectory calculation") of the trajectory of the aircraft 40 by the aircraft control device 10 of the embodiment.

In order to calculate the trajectories of the multiple aircraft 40 that is member of a flight, the aircraft control device 10 uses a calculation method such as Direct Collocation with Nonlinear Programming (DCNLP), in which the optimal solution is obtained by discretizing continuous variables (state variable and control variable).

More specifically, DCNLP converts an optimal control problem into a nonlinear programming problem by discretizing continuous variables of a continuous problem which is a time function, and obtains a solution that minimizes or maximizes the value of an objective function (evaluation function). DCNLP allows for easy inclusion of inequality constraints on the state variables, and is very robust against initial conditions and constraints. An equation of motion can also be used as a constraint.

Figure 3:
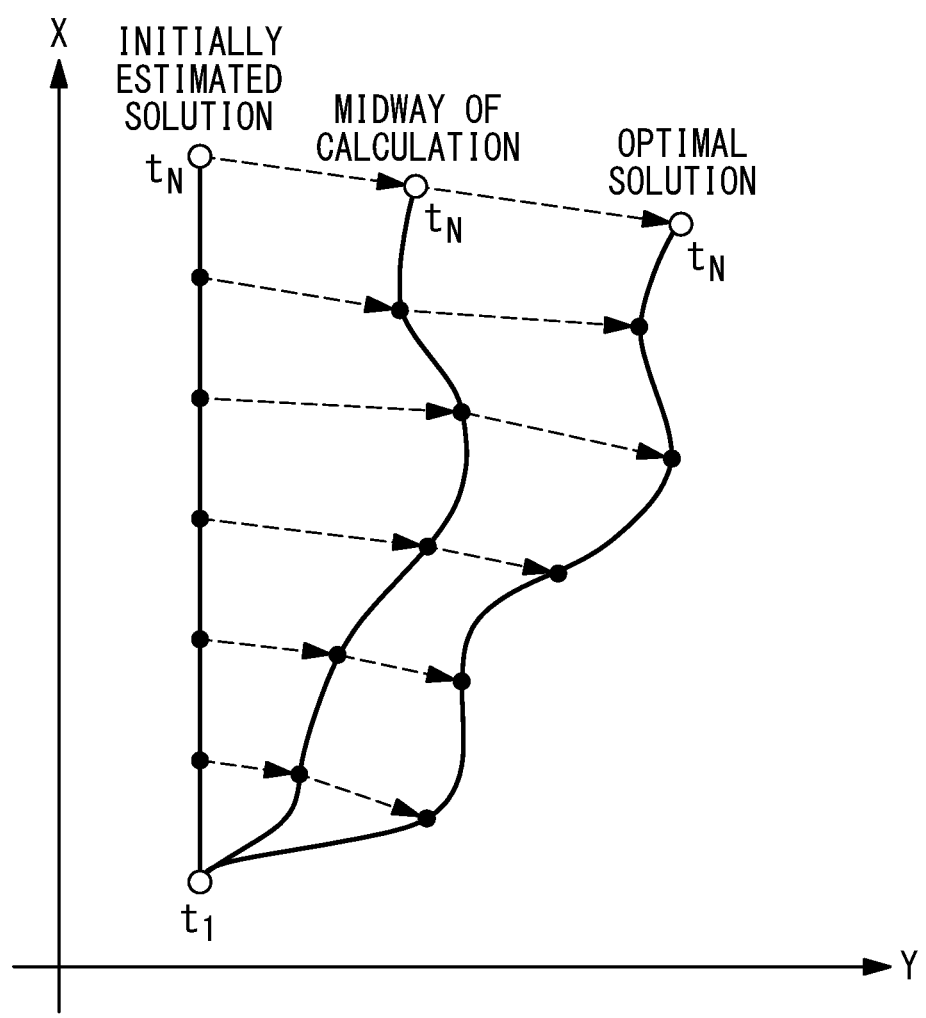
FIG. 3 is a schematic diagram illustrating the concept of DCNLP.

FIG. 3 is a schematic diagram illustrating the concept of DCNLP. Vertical and horizontal axes both indicate state variables in FIG. 3.

In DCNLP, the problem is discretized into N nodes (hereinafter also referred to as "discrete points") $t_1$ to $t_N$ by time t. In DCNLP of the embodiment, the state variable is calculated as nodes, by substituting the control variable into an equation of motion indicating the behavior of the aircraft 40. The embodiment is not limited to this, and other appropriate methods may be used to set the state variable as nodes.

First, to calculate an initially estimated solution of the nodes $t_1$ to $t_N$, an initial value of the control variable is substituted into the equation of motion. Instead of substituting the control variable into the equation of motion, other appropriate methods may be used to set the initially estimated solution of the nodes $t_1$ to $t_N$. The nodes are corrected (midway of calculation in FIG. 3), by use of the amount of change in the objective function relative to microvariation in the control variable and state variable at each node. Then, a node that satisfies the later-mentioned constraints and minimizes (or maximizes) the value of the objective function (also referred to as evaluation function) is determined as the optimal solution of the trajectory of the aircraft 40. Polynomials are used to interpolate between the calculated nodes, for example.

As has been described, instead of calculating the trajectory of the aircraft 40 as a continuous value, the sate variable and control variable may be discretized by use of DCNLP to reduce the amount of calculation, whereby the trajectory can be calculated in a shorter time.

However, since the nodes are not continuous, a trajectory that cannot be flown by the actual aircraft 40 may be calculated, depending on the state variable. Hence, a constraint is imposed in which a deviation between the calculated following node and the appropriate following node is 0 (zero). This constraint is the defect in DCNLP, and if this constraint is satisfied, the calculated node satisfies the equation of motion of the aircraft 40.

Figure 4:
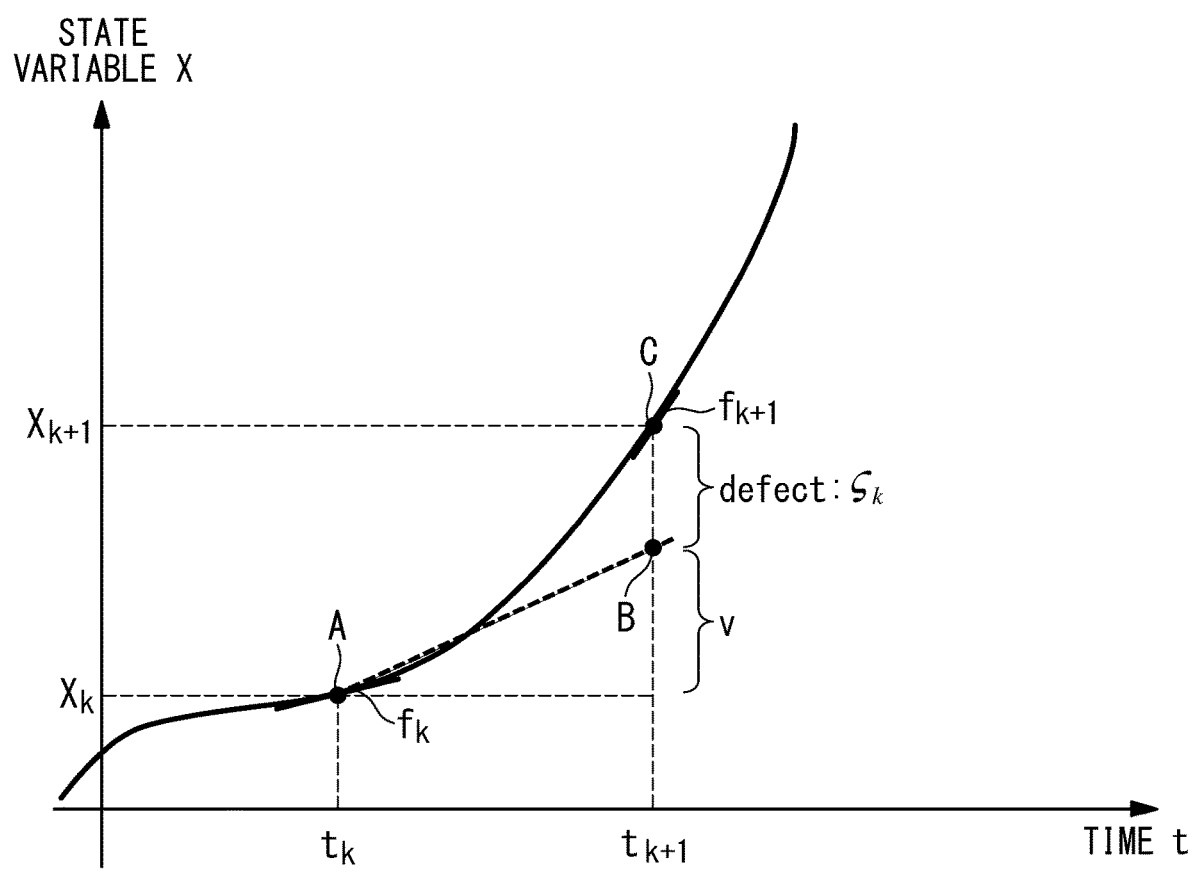
FIG. 4 is a schematic diagram illustrating the concept of the defect in DCNLP.

FIG. 4 is a schematic diagram illustrating the concept of the defect in DCNLP. In FIG. 4, the horizontal axis indicates time, the vertical axis indicates state variables indicating the position of the aircraft 40, and node $A(t_k, X_k)$ and node $C(t_{k+1}, X_{k+1})$ are two adjacent discrete points. Nodes A, C are originally positions on the trajectory of the aircraft 40, and therefore should be joined according to the relation of a differential equation f.

Accordingly, the constraint defined by the defect is that when slopes as derivative values of the nodes A, C are $f_k$, $f_{k+1}$, respectively, the difference between the two adjacent nodes A, C and the amount of change based on the slopes $f_k$, $f_{k+1}$ at the two nodes A, C is zero.

By using the average derivative value of the two nodes A, C expressed by the following formula (1), the amount of change based on the slopes $f_k$, $f_{k+1}$ at the two nodes A, C is expressed by the following formula (2). The value calculated by the following formula (2) indicates point B in FIG. 4. The method of calculating point B by use of equation (2) is merely an example, and the embodiment is not limited to this.

{Expression 1}

$$\frac{f_k + f_{k+1}}{2} \tag{1}$$

{Expression 2}

$$\frac{f_k + f_{k+1}}{2} \times (t_{k+1} - t_k) \tag{2}$$

As has been described, point B is a value obtained recursively from the previous node A, and if the state variable satisfies the equation of motion, point B and node C coincide, and the deviation between point B and node C is the defect. Specifically, the difference between the difference $(X_{k-1} - X_k)$ between the two nodes A, C and the amount of change v expressed by formula (2) indicates the defect.

In other words, the defect is the residual error between node C and point B obtained by use of the derivative values of the adjacent nodes A, C, and is expressed by the following formula (3), where denotes the defect.

{Expression 3}

$$\zeta_k = X_{k+1} - \left\{ X_k + \frac{f_k + f_{k+1}}{2} \times (t_{k+1} - t_k) \right\} \tag{3}$$

Then, if $\xi_k = 0$, point B and node C coincide, and the nodes A, C calculated by use of DCNLP satisfy the equation of motion. Accordingly, the solutions (state variables) that satisfy the constraint defined by the defect satisfy the equation of motion, and are smoothly continuous with one another.

Thereafter, the aircraft control device 10 determines the optimal trajectory among the trajectories satisfying the constraint defined by the defect and constraints corresponding to the role of the aircraft 40, according to an objective function value (evaluation value) obtained by the objective function corresponding to the role.

Hereinafter, constraints corresponding to the roles of the aircraft 40 will be described in detail.

As described earlier, roles of the aircraft 40 are a shooter (shooter 40A) that shoots the guided missile 44, a sensor (sensor 40C) that searches and tracks the target, and a guider (guider 40B) that guides the guided missile 44, for example.

First, a state variable x of the embodiment is expressed by the following formula (4), where ψ denotes an angle of direction indicating the attitude of the aircraft 40, and x, y denote coordinate point of friendly aircraft indicating the position of the aircraft 40. For example, the coordinate axis x of friendly aircraft is based on the North direction, and the coordinate axis y of friendly aircraft is based on the East direction. Although the velocity and altitude of the aircraft 40 is constant in the embodiment, the velocity and altitude may also be state variables.

{Expression 4}

$$X = \begin{Bmatrix} \psi \\ x \\ y \end{Bmatrix} \tag{4}$$

A control variable u in the equation of motion is expressed by the following formula (5), where α denotes the angle of attack, φ denotes the angle of bank, and T denotes thrust.

{Expression 5}

$$u = \begin{Bmatrix} \alpha \\ \phi \\ T \end{Bmatrix} \quad (5)$$

The equation of motion of the aircraft 40 is expressed by the following equations of three degree of freedom (6), for example, where m denotes mass, v denotes velocity, γ denotes the flight path angle, L denotes lift, and D denotes drag. By substituting the aforementioned control variable into the equation of motion expressed by formula (6) as a discrete variable, the state variable of the aircraft 40 is calculated, whereby the initially estimated solution of the trajectory of the aircraft 40 is calculated. However, the embodiment is not limited to this, and other appropriate methods may be used to set the state variable, to set the initially estimated solution of the trajectory of the aircraft 40.

{Expression 6}

$$\frac{d\Psi}{dt} = \frac{1}{mv\cos\gamma}(T\sin\alpha + L)\sin\phi \quad (6)$$

$$\frac{dx}{dt} = v\cos\gamma\cos\psi$$

$$\frac{dy}{dt} = v\cos\gamma\sin\psi$$

Next, a specific description will be given of the constraints corresponding to the role of the aircraft 40.

First, constraints (hereinafter referred to as "common constraints") that are common regardless of the role of the aircraft 40 will be described.

The common constraints are expressed by the following formulae (7) to (10).

{Expression 7}

$$X_{k+1} - \left\{X_k + \frac{f_k + f_{k+1}}{2} \times (t_{k+1} - t_k)\right\}( = \zeta_k) = 0 \quad (k = 1 \sim N) \quad (7)$$

{Expression 8}

$$\frac{1}{m}(T\cos\alpha - D) - g\sin\gamma\left( = \frac{dv}{dt}\right) = 0 \quad (8)$$

{Expression 9}

$$\frac{1}{mv}(T\sin\alpha - L)\cos\phi - \frac{g}{v}\cos\gamma\left( = \frac{d\gamma}{dt}\right) = 0 \quad (9)$$

Formula (7) is a constraint that defect: $\xi_k=0$. Formula (8) is a constraint that the velocity is constant, where D denotes drag. Formula (9) is a constraint that the altitude is constant. A constraint expressed by an equation such as formulae (7) to (9) is called an equality constraint.

In order to allow variation in velocity, the right side of formula (8) may be a certain range, for example, instead of 0. To also allow variation in altitude, the right side of formula (9) may be a certain range, for example, instead of 0. Moreover, constraints other than formulae (8), (9) may be added.

{Expression 10}

$$Nz - 4 \le 0 \quad (10)$$

In formula (10), Nz denotes the normal load factor (hereinafter referred to as "turn G") that is applied during a turn of the aircraft 40, and in formula (10), a constraint is imposed to prevent application of a turn G of 4G or larger, for example. The upper limit of the turn G is determined according to the performance of the aircraft 40 or the state of combat, and may be set to a value larger than in an MRM combat, in a close combat.

A constraint expressed by an inequality such as formula (10) is called as inequality constraint.

Figure 5:
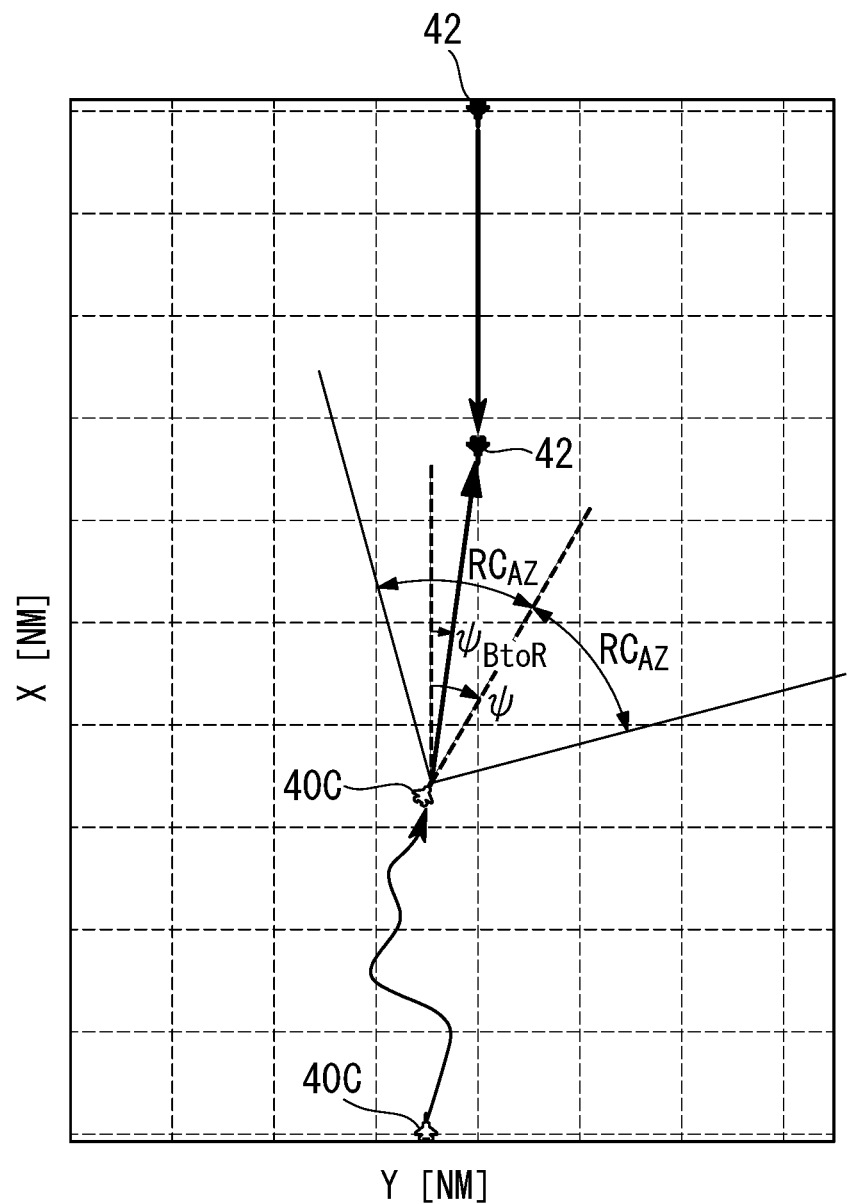
FIG. 5 is a schematic diagram illustrating a trajectory of a sensor aircraft calculated by DCNLP of the embodiment of the present invention.

Next, constraints and an objective function specific to the sensor 40C will be described with reference to FIG. 5. In FIG. 5, the vertical axis direction indicates the North-South (upper direction in FIG. 5 indicates North), and the horizontal axis direction indicates the East-West (right direction in FIG. 5 indicates East). If the searchable and trackable range and the guidable range (coverage area of guidance radio wave that can acquire and track guided missile 44) are the same, the constraints and objective function of the guider 40B is the same as the sensor 40C.

Although the trajectory of the target aircraft 42 is assumed to be rectilinear, for example, in the following description, the embodiment is not limited to this. Instead, the trajectory of the target aircraft 42 may be non-rectilinear, by use of other simulation or the like.

The sensor 40C is required to constantly acquire and track the target aircraft 42 which is the enemy aircraft within the coverage area of the radar, and this is the constraint corresponding to the role of the sensor 40C. This constraint is expressed by the following formula (11), where $RC_{AZ}$ denotes the radar coverage area in the azimuth direction, and $\psi_{BtoR}$ denotes the orientation of the enemy aircraft as viewed from the friendly aircraft.

{Expression 11}

$$(\psi - RC_{AZ}) - \psi_{BtoR} \le 0$$

$$\psi_{BtoR} - (\psi + RC_{AZ}) \le 0 \quad (11)$$

Formula (11) is an inequality constraint for calculating the trajectory of the sensor 40C. Although this example does not require an equality constraint for the sensor 40C, some equality constraint may be set.

An objective function $J(\xi)$ corresponding to the role of the sensor 40C is expressed by the following formula (12), where $(x_{red}, y_{red})$ denotes the coordinate point of enemy, and $k_1, k_2$ denote weighting factors. The state variable X and the control variable u are substituted into the objective function $J(\xi)$, and the objective function value obtained therefrom is an evaluation value.

{Expression 12}

$$J(\xi) = -k_1 \cdot \sum_{i}^{node} \sqrt{(x(i) - x_{red}(i))^2 + (y(i) - y_{red}(i))^2} + k_2 \cdot \sum_{i}^{node} \phi_i^2 \quad (12)$$

$$\xi = \begin{Bmatrix} X \\ u \end{Bmatrix}$$

Of the right side of formula (12) which is the objective function $J(\xi)$, the first term is the sum total of the distances (hereinafter referred to as "friend-enemy distance") between the aircraft 40 (friendly aircraft) and the target aircraft 42 (enemy aircraft) at the respective nodes (discrete points), and the second term is the sum of squares of the angle of bank of the aircraft 40 (friendly aircraft) at the respective nodes.

Since the aircraft 40 should preferably be as far away from the target aircraft 42 as possible, it is preferable that the value of the first term be as large as possible. The second term is a term that indicates stability of the angle of bank, and the smaller the value of the second term, the more stable the trajectory is with less variation in the angle of bank. Hence, it is preferable that the value of the second term be as small as possible. Furthermore, the first and second terms are multiplied by the weighting factors $k_1$, $k_2$, to adjust the weight of the friend-enemy distance and the angle of bank on the objective function $J(\xi)$.

The first term is a negative function and the second term is added to the first term, so that the smaller the objective function value, the higher the evaluation.

Figure 6:
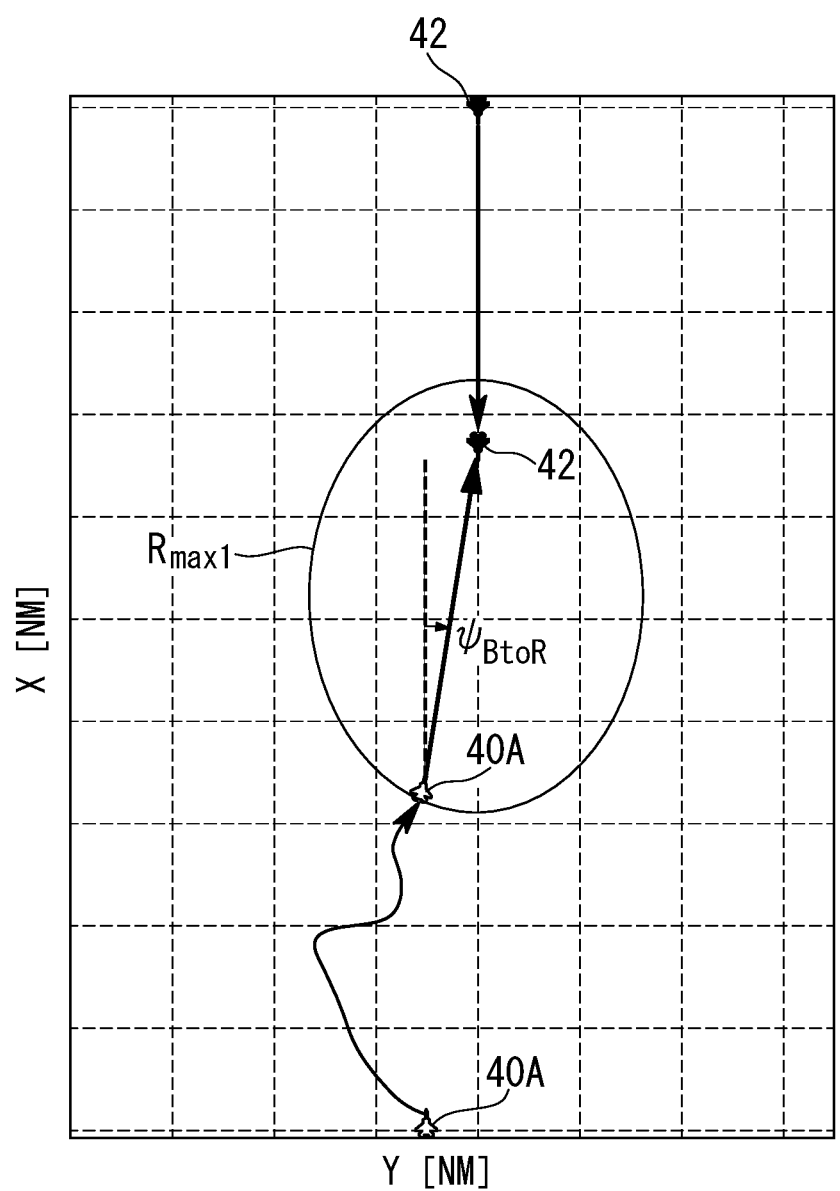
FIG. 6 is a schematic diagram illustrating a trajectory of a shooter aircraft calculated in DCNLP of the embodiment of the present invention.

Next, constraints and an objective function specific to the shooter 40A will be described with reference to FIG. 6. In FIG. 6, the vertical axis direction indicates the North-South (upper direction in FIG. 6 indicates North), and the horizontal axis direction indicates the East-West (right direction in FIG. 6 indicates East).

The shooter 40A is required to have its nose pointed toward the target aircraft 42 when the guided missile is shot. This is the constraint corresponding to the role of the shooter 40A. This constraint is expressed by the following formula (13), where $t_{shoot}$ denotes the time when the guided missile 44 is shot, and $\psi(t_{shoot})$ denotes the orientation of the friendly aircraft at this time.

{Expression 13}

$$\psi(t_{shoot}) - \psi_{BtoR} = 0 \quad (13)$$

Instead of the equality constraint, Formula (13) may be an inequality constraint in which the left side is a certain angle range (e.g., ±5°).

The inequality constraint imposed on the shooter 40A is that the friend-enemy distance should be within a range $R_{max1}$ of the guided missile 44 when the guided missile is shot, and that the guided missile 44 should be shot within a simulation time. This inequality constraint is expressed by the following formula (14), where simulation time is assumed to be $t_1$ to $t_N$, and $t_{shoot}$ denotes the time when the guided missile is shot. In this example, the range $R_{max1}$ varies depending on the relative angle (angle off) between the shooter 40A and the target aircraft 42.

{Expression 14}

$$\sqrt{(x(t_{shoot}) - x_{red}(t_{shoot}))^2 + (y(t_{shoot}) - y_{red}(t_{shoot}))^2} - R_{max1} \leq 0 \quad (14)$$
$$t_1 - t_{shoot} \leq 0$$
$$t_{shoot} - t_N \leq 0$$

The objective function $J(\xi)$ corresponding to the role of the shooter 40A is expressed by the following formula (15), where $k_3$ to $k_7$ denote weighting factors.

{Expression 15}

$$J(\xi) = k_3 \cdot t_{shoot} - k_4 \cdot \sqrt{(x(t_{shoot}) - x_{red}(t_{shoot}))^2 + (y(t_{shoot}) - y_{red}(t_{shoot}))^2} - k_5 \cdot \min_i\left(\sqrt{(x(i) - x_{red}(i))^2 + (y(i) - y_{red}(i))^2}\right) - k_6 \cdot \sum_{t_{shoot}+1}^{node} \sqrt{(x(i) - x_{red}(i))^2 + (y(i) - y_{red}(i))^2} + k_7 \cdot \sum_i^{node} \phi_i^2 \quad (15)$$

Of the right side of formula (15), the first term is the time from start of the simulation to shooting of the guided missile, the second term is the friend-enemy distance when the guided missile is shot, the third term is the minimum value of the friend enemy distance (hereinafter referred to as "minimum friend-enemy distance"), the fourth term is the sum total of the friend-enemy distances after shooting of the guided missile, and the fifth term is the sum of squares of the angle of bank of the friendly aircraft at the respective nodes. The first to fifth terms are multiplied by the weighting factors $k_3$ to $k_7$, respectively.

Specifically, it is preferable that the trajectory of the shooter 40A reduce the time before shooting of the guided missile, increase the friend-enemy distance when shooting the guided missile, increase the minimum friend-enemy distance, and increase the sum of the friend-enemy distances after shooting of the guided missile. The smaller the value calculated by the objective function $J(\xi)$ expressed by formula (15), the higher the evaluation.

As can be seen from formulae (12) and (15), the objective function $J(\xi)$ includes a function for calculating the friend-enemy distance between the aircraft 40 and the target aircraft 42 regardless of the role of the aircraft 40, and a trajectory where the friend-enemy distance is appropriate to the role is determined as the optimal trajectory.

Next, optimal trajectory calculation (also referred to as "constrained nonlinear programming problem") using the aforementioned DCNLP will be described.

Figure 7:
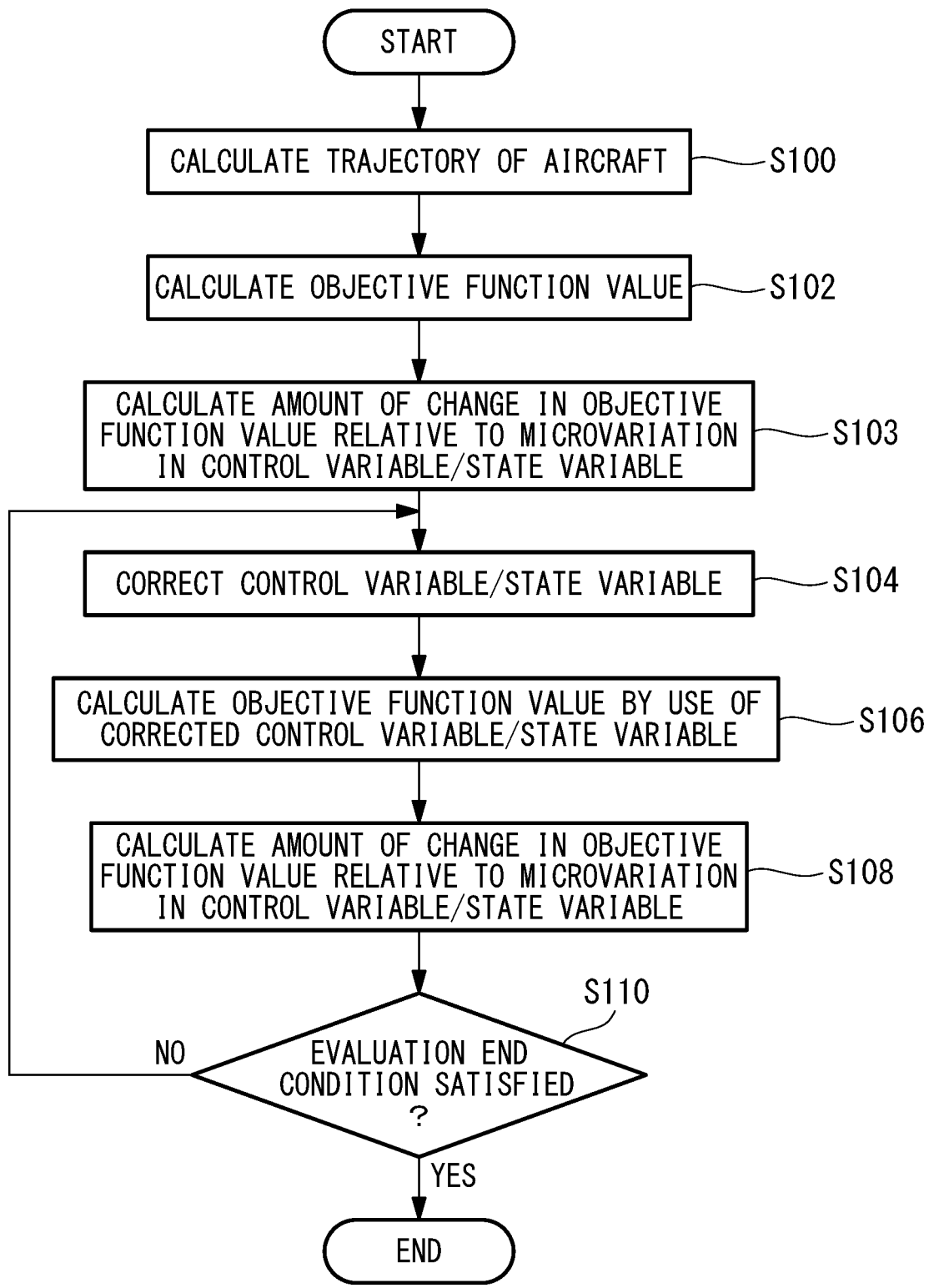
FIG. 7 is a flowchart illustrating a flow of optimal trajectory calculation of the embodiment of the present invention.

FIG. 7 is a flowchart illustrating a flow of optimal trajectory calculation processing. Optimal trajectory calculation is performed by the aircraft control device 10.

First, in step 100, the maneuver of the aircraft 40 is calculated by substituting the control variable u which is the initially estimated solution into the equation of motion. Other appropriate methods may be used to set the initially estimated solution. The initially estimated solution affects feasibility of solving and the required calculation time of solving, and therefore needs to more surely satisfy the constraints. In this example, the pilot of the aircraft 40 sets the control variable u as the initially estimated solution based on an empirical value.

In step 102, an objective function value J (evaluation value) is calculated, by substituting the control variable u and a state variable X that satisfy constraints corresponding to the assigned role, into an objective function $J(\xi)$ corresponding to the role.

In the next step 103, the amount of microvariation in the control variable/state variable (at least one of control variable and state variable) is calculated. In step 103 of this example, the amount of microvariation is a predetermined value depending on the control variable/state variable.

In the next step 104, the control variable/state variable (at least one of control variable and state variable) is corrected. The amount of correction of the control variable/state variable is calculated, according to the amount of change in the objective function value J relative to the previous microvariation in the control variable/state variable.

In the next step 106, the objective function value J is calculated by use of the corrected control variable/state variable.

In the next step 108, the amount of change in the objective function value J relative to microvariation in the control variable/state variable is calculated.

In the next step 110, it is determined whether an evaluation end condition is satisfied, and if it is determined YES, the simulation is terminated. If it is determined NO, the processing returns to step 104, the control variable/state variable is micro-varied, and calculation of the amount of change in the objective function value is repeated.

Figure 8:
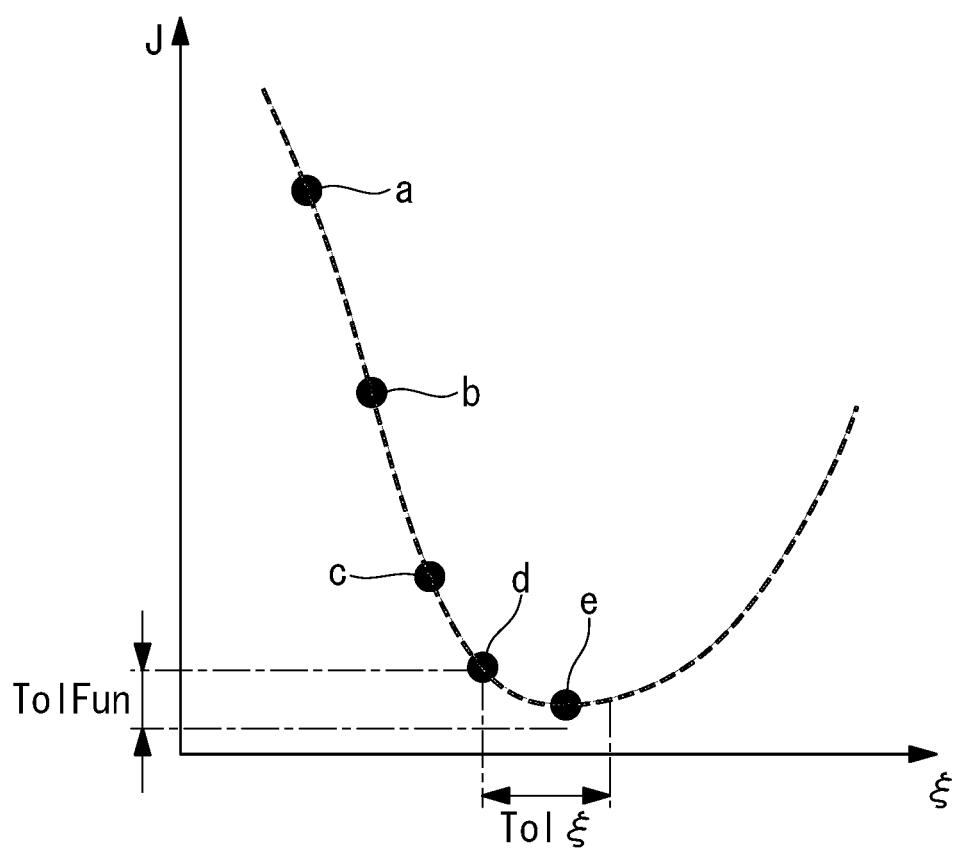
FIG. 8 is a schematic diagram illustrating end conditions of evaluation of an objective function value, in optimal trajectory calculation of the embodiment of the present invention.
Figure 9A:
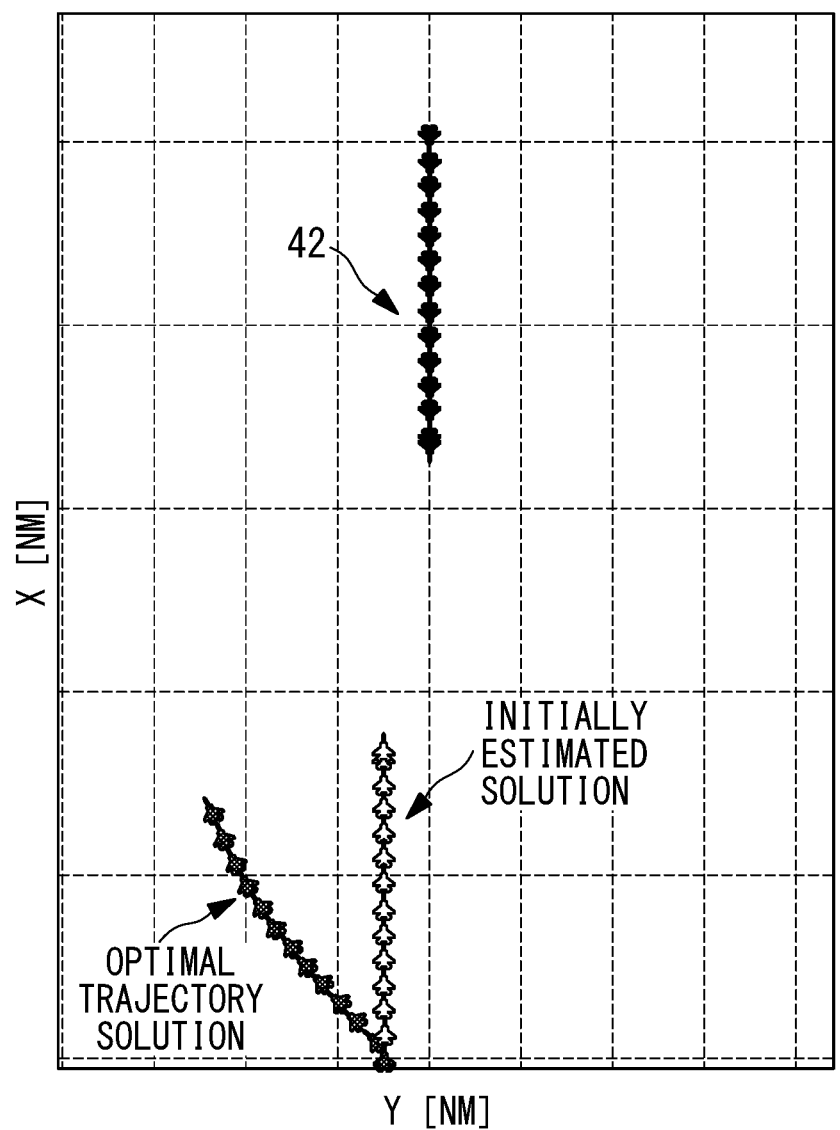
FIG. 9A is a diagram illustrating a result of optimal trajectory calculation of the embodiment of the present invention, and shows an optimal trajectory solution for a friendly aircraft, obtained by the optimal trajectory calculation.
Figure 9B:
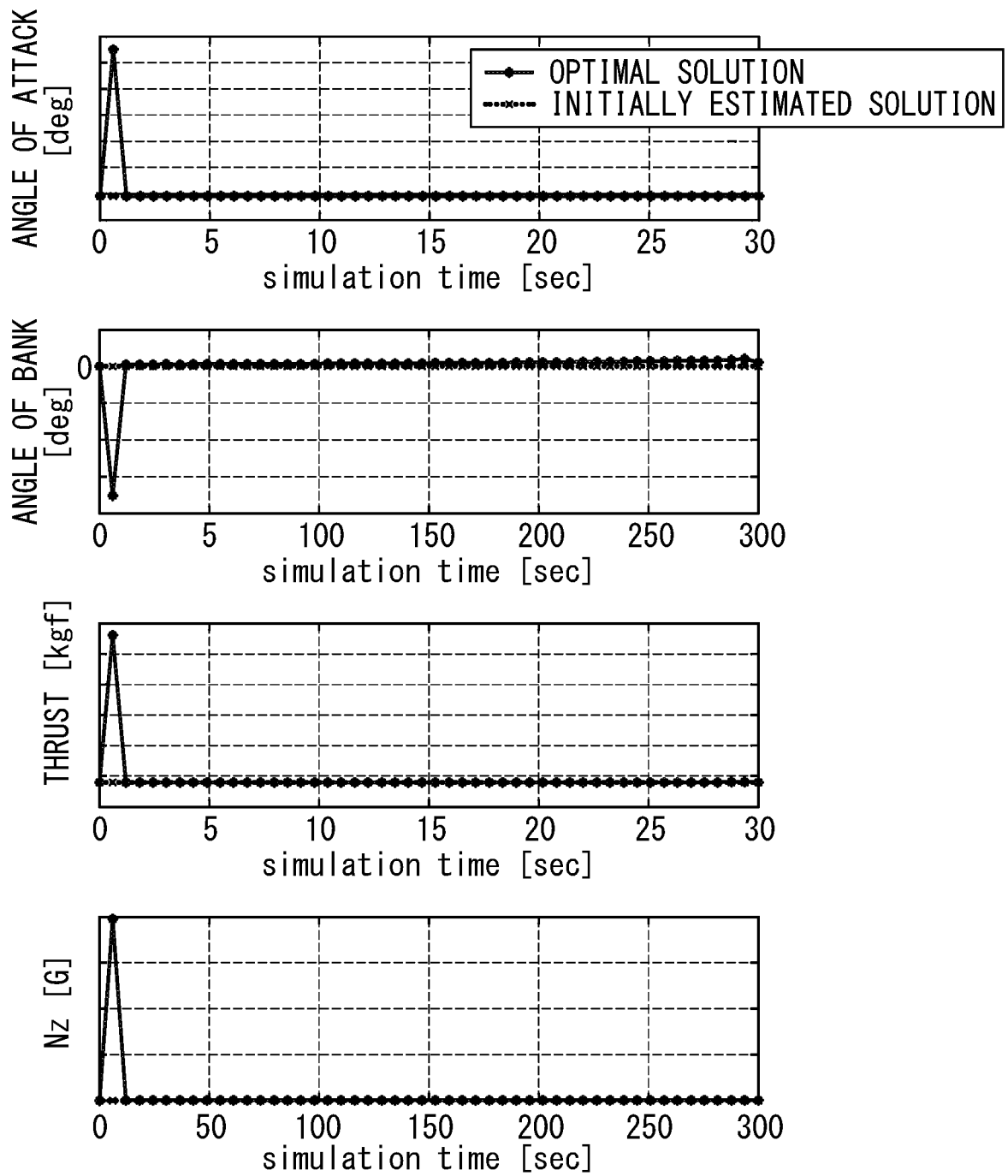
FIG. 9B is a diagram illustrating a result of optimal trajectory calculation of the embodiment of the present invention, and shows time variation of control variables.
Figure 10A:
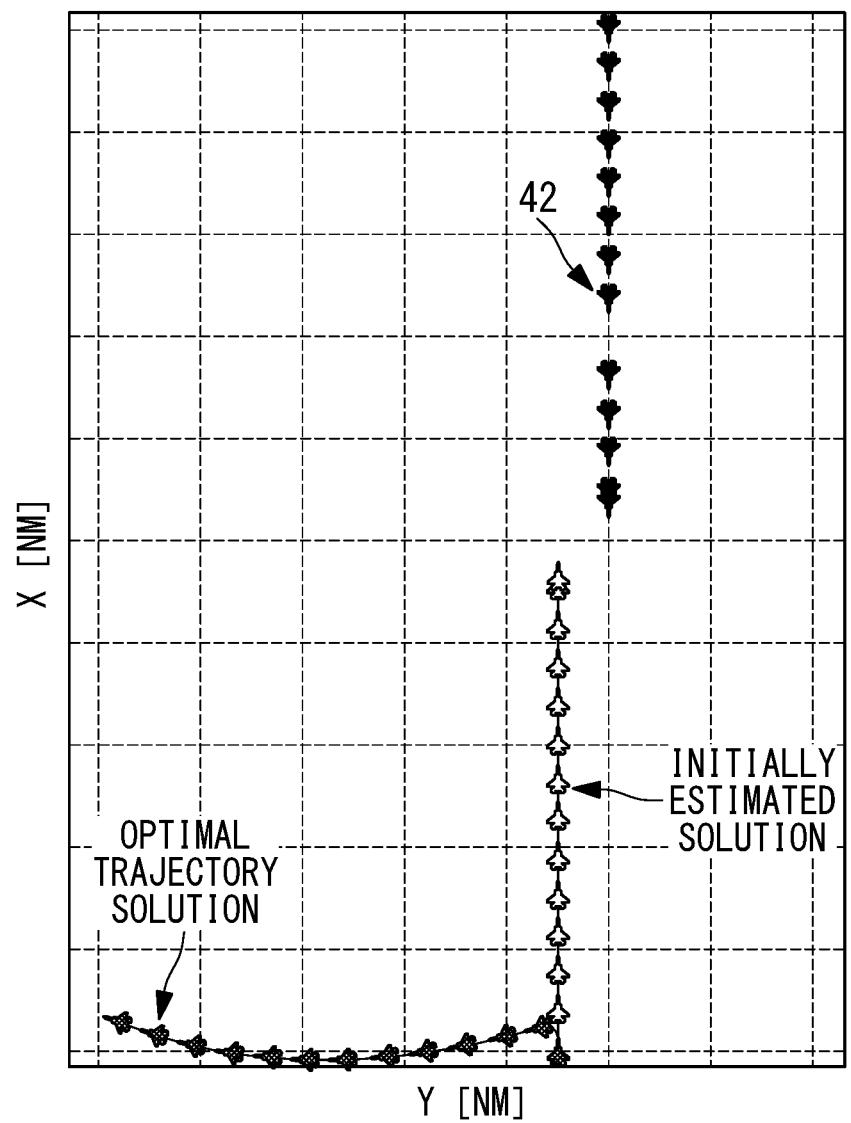
FIG. 10A is a diagram illustrating a result of optimal trajectory calculation of the embodiment of the present invention, and shows an optimal trajectory solution for a friendly aircraft, obtained by the optimal trajectory calculation.
Figure 10B:
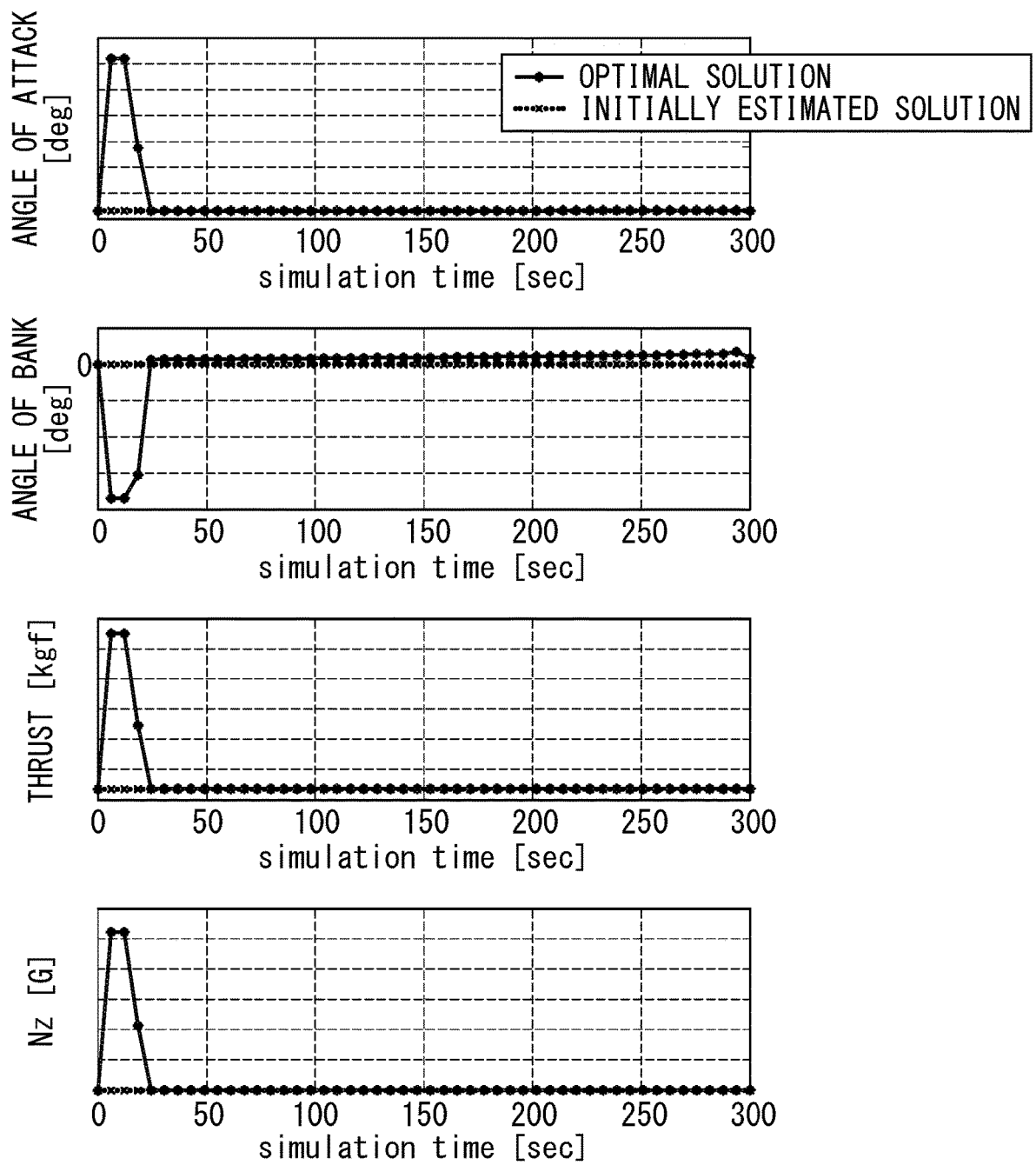
FIG. 10B is a diagram illustrating a result of optimal trajectory calculation of the embodiment of the present invention, and shows time variation of control variables.
Figure 11A:
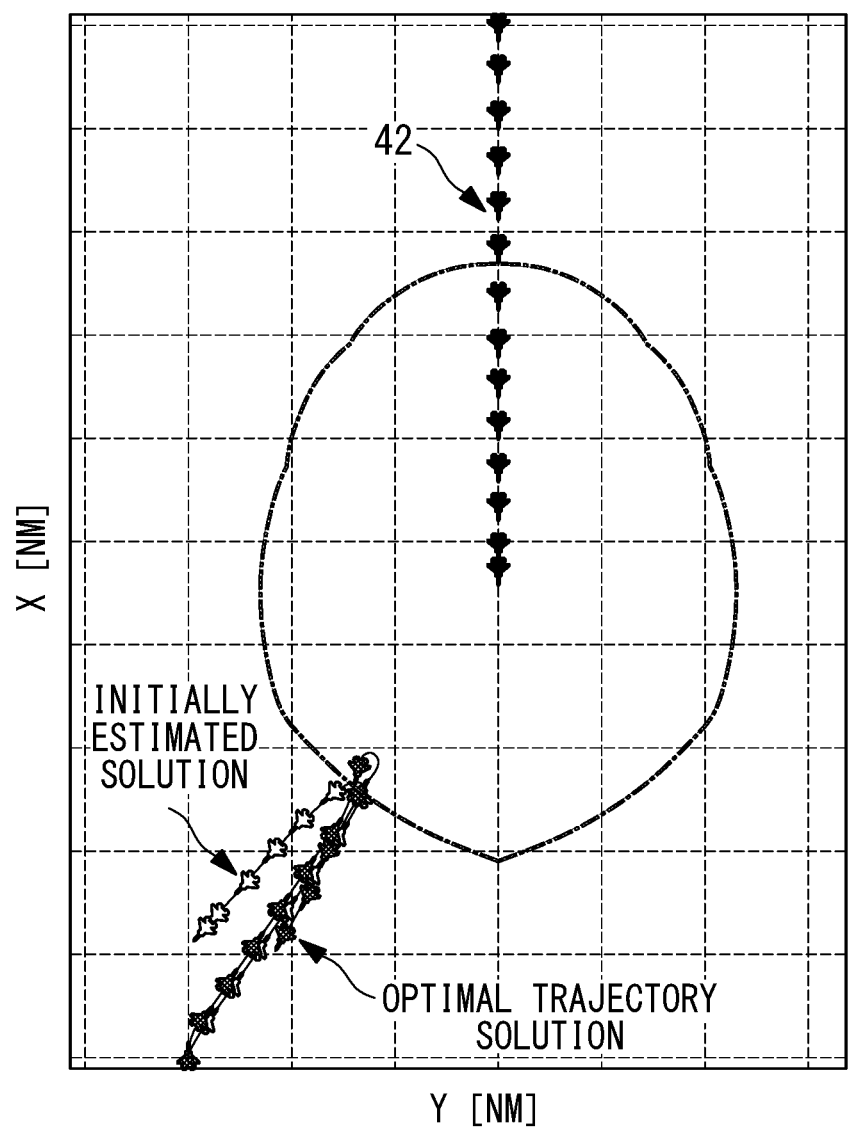
FIG. 11A is a diagram illustrating a result of optimal trajectory calculation of the embodiment of the present invention, and shows an optimal trajectory solution for a friendly aircraft, obtained by the optimal trajectory calculation.
Figure 11B:
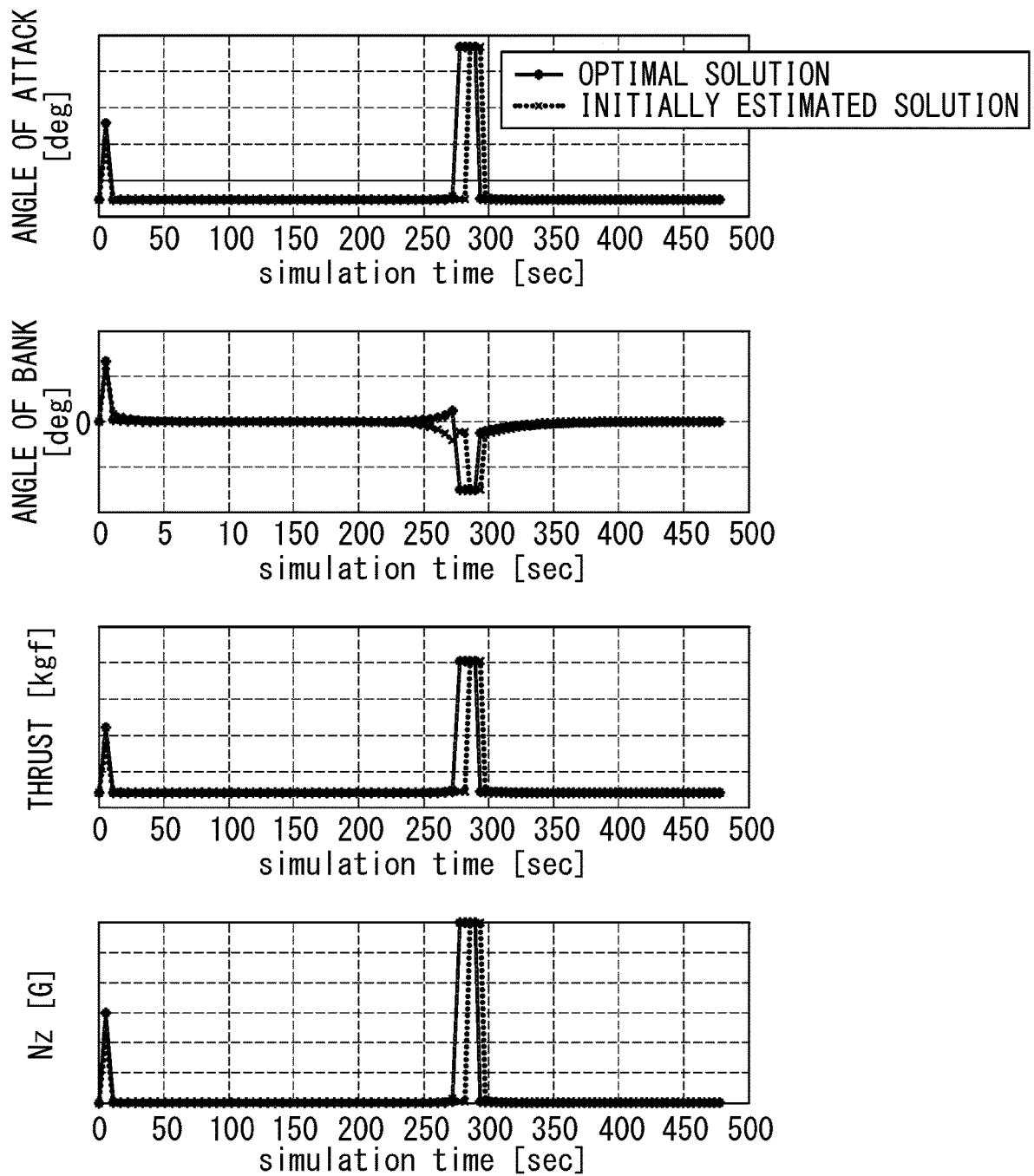
FIG. 11B is a diagram illustrating a result of optimal trajectory calculation of the embodiment of the present invention, and shows time variation of control variables.
Figure 12A:
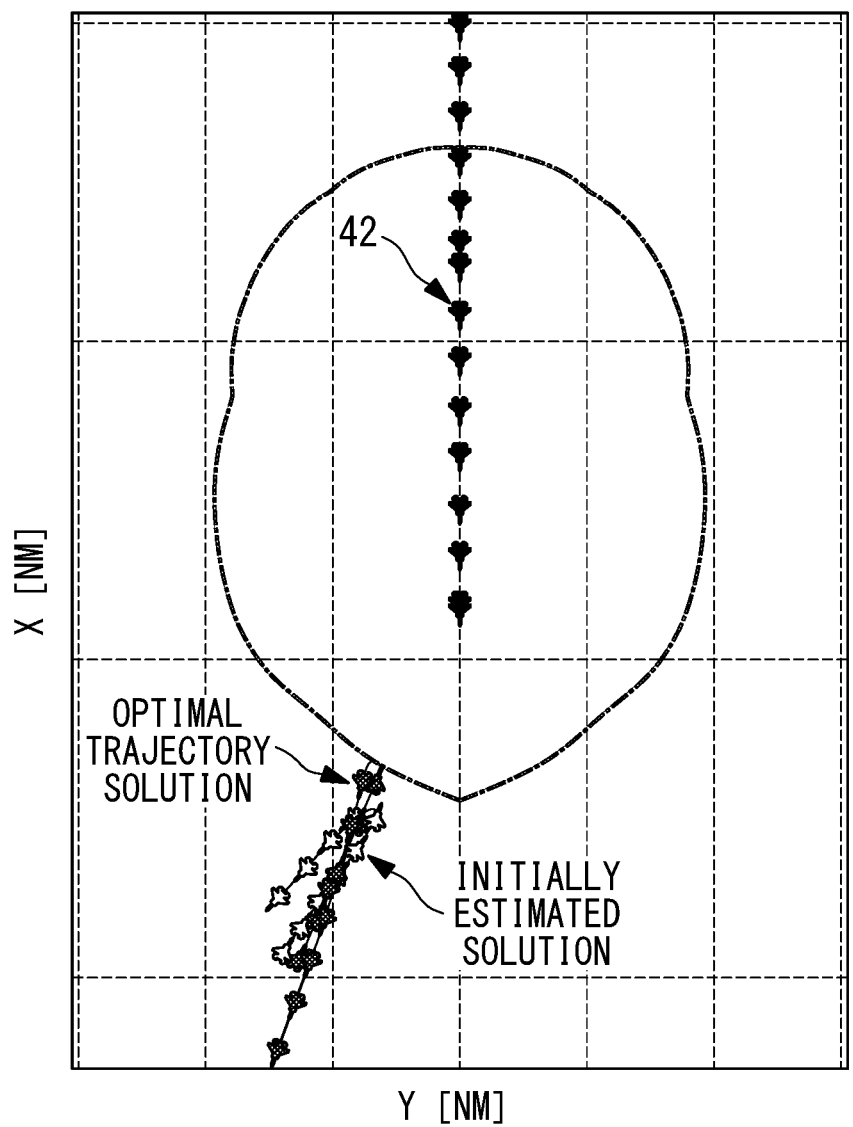
FIG. 12A is a diagram illustrating a result of optimal trajectory calculation of the embodiment of the present invention, and shows as optimal trajectory solution for a friendly aircraft, obtained by the optimal trajectory calculation.
Figure 12B:
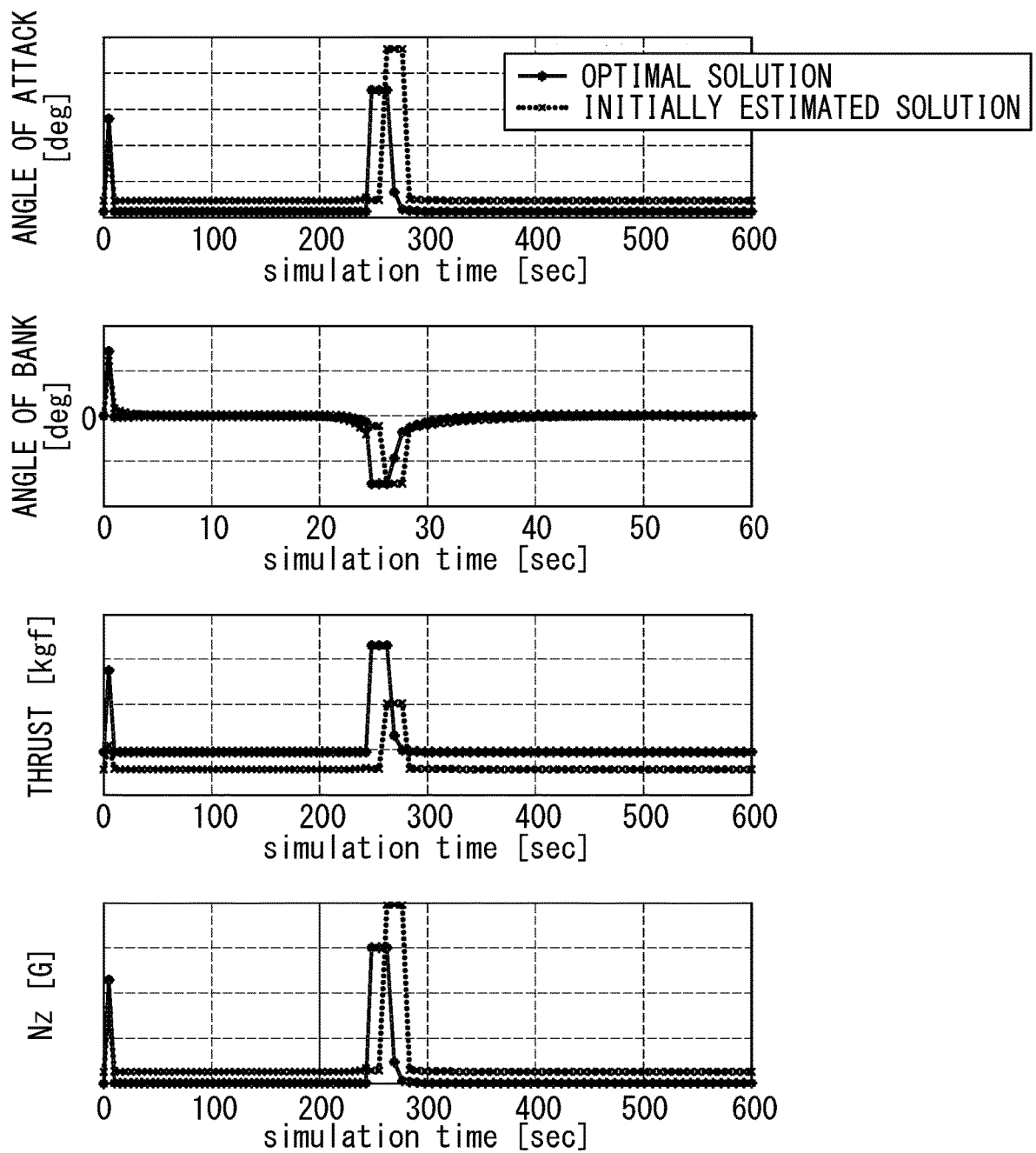
FIG. 12B is a diagram illustrating a result of optimal trajectory calculation of the embodiment of the present invention, and shows time variation of control variables.

The evaluation end condition in step 110 will be described with reference to FIG. 8. In FIG. 8, the horizontal axis indicates the control variable/state variable $\xi$, the vertical axis indicates the objective function value J, and points a to e indicate variation in the objective function value J relative to the control variable/state variable $\xi$.

The end condition includes the following four conditions, for example.

Condition 1: the amount of change in the control variable/state variable $\xi$ falls below a tolerance Tol$\xi$.

Condition 2: the amount of change in the objective function value J falls below a tolerance TolFun.

Condition 3: first-order optimality measure falls below a tolerance.

Condition 4: the number of iterations of steps 104 to 108 or the number of evaluations of the objective function value J exceeds a tolerance.

Next, the first-order optimality in the above Condition. 3 will be described.

The first-order optimality of a constrained nonlinear programming problem is obtained according to the Karush-Kuhn-Tucker conditions ("KKT conditions" below).

The KKT conditions are equivalent to a condition that with no constraint, a gradient $\nabla J(\xi)$ which is a slope is substantially zero in the vicinity of a minimum value (vicinity of point e in FIG. 8, where variation of objective function value J is convex downward) of the objective function $J(\xi)$. However, when a constraint is imposed, the definition is expressed by the following formula (16).

Satisfying the first-order optimality is a necessary condition but not a sufficient condition. This is because gradient $\nabla J(\xi)=0$ may also occur in the vicinity of the maximum value, where variation of the objective function value J is convex upward.

A Lagrange function $L(\xi, \lambda)$ used for the KKT conditions is expressed by the following formula (16). In the following formula (16), $g(\xi)$ denotes the inequality constraint expression, $h(\xi)$ denotes the equality constraint, $\lambda_g$ denotes a Lagrange multiplier of the inequality constraint expression, and $\lambda_h$ denotes a Lagrange multiplier of the equality constraint expression.

{Expression 16}

$$L(\xi, \lambda) = J(\xi) + \sum_i \lambda_{g,i} \cdot g_i(\xi) + \sum_j \lambda_{h,j} \cdot h_j(\xi) \quad (16)$$

The KKT conditions to be satisfied are expressed by the following formulae (17), (18) by use of the Lagrange function.

{Expression 17}

$$\frac{\partial L(\xi, \lambda)}{\partial \xi} = 0 \quad (17)$$

$$\lambda_{g,i} \cdot g_i(\xi) = 0$$

{Expression 18}

$$g(\xi) \leq 0 \quad (18)$$
$$h(\xi) = 0$$
$$\lambda_{g,i} \geq 0$$

Moreover, the second-order sufficient condition indicating sufficiency of the optimal solution is a condition that a Hessian matrix of the Lagrange function $L(\xi, \lambda)$ is a positive definite, as indicated by the following formula (19).

{Expression 19}

$$\frac{\partial^2 L(\xi, \lambda)}{\partial \xi^2} > 0 \quad (19)$$

Formula (19) indicates that the variation in the objective function value J is convex downward relative to the control variable/state variable. Hence, the objective function value J is the optimal solution when it satisfies the second-order sufficient condition, in addition to the first-order optimality which is a necessary condition.

Next, examples of the result of optimal trajectory calculation will be described with reference to FIGS. 9 to 12. FIGS. 9A, 10A, 11A, 12A show an optimal trajectory solution of the friendly aircraft obtained by optimal trajectory calculation, while FIGS. 9B, 10B, 11B, 12B are graphs indicating discretized time variation of the angle of attack, angle of bank, and thrust, which are control variables, and time variation of the turn G for reference.

In FIGS. 9A, 10A, 11A, 12A, of the friendly aircraft of which optimal trajectory calculation is started from X=0 (NM), those in white indicate the initially estimated solution, and those in hatched lines indicate the optimal trajectory solution calculated by optimal trajectory calculation. The target aircraft 42 is assumed to fly rectilinearly from the North direction.

FIGS. 9, 10 show the result of calculation of the optimal trajectory of the sensor 40C. The sensor coverage area is ±60° in FIG. 9, and ±120° in FIG. 10.

FIGS. 11, 12 show the result of calculation of the optimal trajectory of the shooter 40A. The range of the guided missile 44 is approximately 50 miles in FIG. 11, and approximately 80 miles in FIG. 12. In FIGS. 11, 12, an area circled by a dash-dot line indicates a general range of the guided missile 44.

Next, joint optimization (hereinafter referred to as "joint optimization processing") of the trajectory and role of the aircraft 40 will be described.

The joint optimization processing of the embodiment is performed concurrently with the aforementioned optimal trajectory calculation.

In joint optimization processing, the aforementioned objective function and constraints corresponding to the role are integrated. In addition, a variable (hereinafter referred to as "indicator variable") is assigned to each of the aforementioned objective function and constraints corresponding to the role. The indicator variable is provided to invalidate objective functions and constraints that do not correspond to the assigned role of the aircraft 40.

Then, in the joint optimization processing, an indicator variable value is determined for each objective function and each constraint, to invalidate the objective functions and constraints that do not correspond to the assigned role of the aircraft 40. The invalidated objective functions and constraints are kept from affecting calculation of the trajectory of the aircraft 40. Hence, the trajectory is calculated based only on the objective function and constraints that are not invalidated.

In the joint optimization processing, the trajectory of the aircraft 40 is calculated every time the role of the aircraft 40, that is, the invalidated objective functions and constraints are varied, and the result is evaluated. Thus, the optimal role and trajectory of the aircraft 40 can be determined concurrently.

The indicator variable of the embodiment is varied between 1 and 0, for example.

Accordingly, the indicator variable assigned to the objective function and constraints corresponding to the role assigned to the aircraft 40 is set to 1, and is considered as valid. On the other hand, the indicator variable assigned to the objective functions and constraints that do not correspond to the role assigned to the aircraft 40 is set to 0, and is invalidated.

In other words, the indicator variable sets the role of the aircraft 40. That is, the role corresponding to the objective function and constraints assigned the indicator variable 1 is assigned as the role of the aircraft 40.

Next, a specific description will be given of how the role of the aircraft 40 is determined. In the following description, there are assumed to be two friendly aircraft as the aircraft 40, and two enemy aircraft as the target aircraft 42, for example. For this reason, the two friendly aircraft are denoted by B #1, B #2, and the two enemy aircraft are denoted by R #1, R #2.

Table 1 shows an objective function and constraints when the role of the aircraft 40 is the shooter 40A (SHT).

TABLE 1

| Objective function | $J_{\alpha,\beta}^{SHT}$ |
|---|---|
| Equality constraint | $h_{\alpha,\beta}^{SHT} = 0$ |
| Inequality constraint | $g_{\alpha,\beta}^{SHT} \leq 0$ |

In Table 1, $\alpha$ indicates B #1 or B #2, and $\beta$ indicates R #1 or R #2.

For example, an objective function $J^{SET}_{B\#1,R\#2}$ denotes an objective function when B #1 shoots the guided missile 44 toward R #2. An inequality constraint $g^{SHT}_{B\#1,R\#2}$ denotes an inequality constraint when B #1 shoots the guided missile 44 toward R #2. An equality constraint $h^{SHT}_{B\#1,R\#2}$ denotes an equality constraint when B #1 shoots the guided missile 44 toward R #2.

Next, Table 2 shows an objective function and constraints when the role of the aircraft 40 is the sensor 40C (SNS).

TABLE 2

| Objective function | $J_{\alpha,\beta}^{SNS}$ |
|---|---|
| Equality constraint | — |
| Inequality constraint | $g_{\alpha,\beta}^{SNS} \leq 0$ |

In Table 2, $\alpha$ indicates B #1 or B #2, and $\beta$ indicates R #1 or R #2.

For example, an objective function $J^{SKS}_{B\#1,R\#2}$ denotes an objective function when B #1 searches and tracks R #2. An inequality constraint $g^{SNS}_{B\#1,R\#1}$ denotes an inequality constraint when B #1 searches and tracks R #2. As mentioned earlier in the description of DCNLP, this example does not require an equality constraint.

Also, constraints common to the two friendly aircraft regardless of the assigned role may be set as shown in Table 3.

TABLE 3

| Equality constraint | $h_{\alpha}^{com} = 0$ |
|---|---|
| Inequality constraint | $g_{\alpha}^{com} \leq 0$ |

In Table 3, $\alpha$ of the inequality constraint indicates B #1 or B #2, or B #1 and B #2. In particular, the inequality constraint where a is B #1 and B #2 is a condition that the distance between B #1 and B #2 is longer than a predetermined value. This condition is aimed to avoid collision among accompanying aircraft.

Next, the indicator variable will be described.

Table 4 shows different types of indicator variables. In Table 4, the indicator variable is denoted by $\delta_{ij}$. A task i indicates the role of the friendly aircraft, and an agent j indicates the friendly aircraft that carries out the task (role).

TABLE 4

| | | Agent j | |
|---|---|---|---|
| Task i | Description of task | B#1(j = 1) | B#2(j = 2) |
| i = 1 | Shoot guided missile toward R#1 | $\delta_{11}$ | $\delta_{12}$ |
| i = 2 | Search and track R#1 | $\delta_{21}$ | $\delta_{22}$ |
| i = 3 | Shoot guided missile toward R#2 | $\delta_{31}$ | $\delta_{32}$ |
| i = 4 | Search and track R#2 | $\delta_{41}$ | $\delta_{42}$ |

Then, $\delta_{ij}=1$ is set when the task i is assigned to the agent j and $\delta_{ij}=0$ is set when the task i is not assigned to the agent j. For example, when B #1 as an agent carries out a task of shooting the guided missile 44 toward R #1, $\delta_{11}$ is set to 1, while $\delta_{ij}$ combinations of other tasks i and agents j are set to 0.

In the embodiment, multiple aircraft 40 of the same role are not assigned to the same target aircraft 42, for example. Specifically, if $\delta_{11}=1$, $\delta_{12}=0$, for example. This is an equality constraint $h^{tsk}=0$ related to task (role) assignment, and more specifically, is expressed by the following formula (20).

{Expression 20}

$$h^{tsk} = \sum_j \delta_{ij} - 1 = 0 \quad (20)$$

That is, the constraint related to task assignment is that only a single role is assigned to a single friendly aircraft.

Next, the integrated objective functions and the integrated constraints will be described.

The following formula (21) indicates the integrated objective tive function (hereinafter referred to as "integrated objective function $J_{INT}$").

{Expression 21}

$$J_{INT} = \delta_{11} \cdot J_{B\#1,R\#1}^{SHT} + \delta_{31} \cdot J_{B\#1,R\#2}^{SHT} + \delta_{12} \cdot J_{B\#2,R\#1}^{SHT} + \delta_{32} \cdot J_{B\#2,R\#2}^{SHT} + \delta_{21} \cdot J_{B\#1,R\#1}^{SNS} + \delta_{41} \cdot J_{B\#1,R\#2}^{SNS} + \delta_{22} \cdot J_{B\#2,R\#1}^{SNS} + \delta_{42} \cdot J_{B\#2,R\#2}^{SNS} \quad (21)$$

The integrated objective function $J_{INT}$ is obtained by multiplying every objective function by the indicator variable $\delta_{ij}$, and finding the sum total of the objective functions multiplied by the indicator variable $\delta_{ij}$. Then, when calculating the objective function value (evaluation value) from the integrated objective function $J_{INT}$, the indicator variable $\delta_{ij}$ of all of the objective functions are set to 1 or 0.

The following formula (22) indicates the integrated equality constraint (hereinafter referred to as "integrated equality constraint $h_{INT}$"). In the integrated equality constraint $h_{INT}$, the equality constraints are integrated.
{Expression 22}

$$h_{INT}: \delta_{11} \cdot h_{B\,\#1,R\,\#1}^{SHT} = 0$$

$$\delta_{31} \cdot h_{B\,\#1,R\,\#2}^{SHT} = 0$$

$$\delta_{12} \cdot h_{B\,\#2,R\,\#1}^{SHT} = 0$$

$$\delta_{32} \cdot h_{B\,\#2,R\,\#2}^{SHT} = 0$$

$$h_{B\,\#1}^{com} = 0$$

$$h_{B\,\#2}^{com} = 0$$

$$h^{tsk} = 0 \quad (22)$$

Since equality constraints are not set for the sensor 40C as mentioned earlier, formula (22) does not include equality constraints specific to the sensor 40C. However, if equality constraints are set for the sensor 40C, too, the equality constraints specific to the sensor 40C expressed by the following formula (23) are added to the formula (22).
{Expression 23}

$$\delta_{21} \cdot h_{B\,\#1,R\,\#1}^{SNS} = 0$$

$$\delta_{41} \cdot h_{B\,\#1,R\,\#2}^{SNS} = 0$$

$$\delta_{22} \cdot h_{B\,\#2,R\,\#1}^{SNS} = 0$$

$$\delta_{42} \cdot h_{B\,\#2,R\,\#2}^{SNS} = 0 \quad (23)$$

In The integrated equality constraint $h_{INT}$, every equality constraint is multiplied by the indicator variable $\delta_{ij}$. Then when determining the validity of the integrated equality constraint $h_{INT}$, the indicator variable $\delta_{ij}$ of all of the equality constraints are set to 1 or 0.

As indicated by the above formulae (21) to (23), the objective functions and equality constraints are each multiplied by the indicator variable $\delta_{ij}$. Then, the indicator variable $\delta_{ij}$ assigned to the objective function and equality constraints corresponding to the role assigned to the aircraft 40 is set to 1. On the other hand, the indicator variable $\delta_{ij}$ assigned to the unnecessary objective functions and equality constraints that do not correspond to the assigned role of the aircraft 40 is set to 0. Thus, the unnecessary objective functions and equality constrains are invalidated.

Since the indicator variable $\delta_{ij}$ thus sets the value of unnecessary objective functions to 0, the integrated objective function $J_{INT}$ can calculate an objective function value (evaluation value) corresponding to the assigned role of the aircraft 40, while avoiding influence of unnecessary objective functions. Additionally, since the equality constraint is created by setting the value of unnecessary equality constraints to 0, the integrated equality constraint $h_{INT}$ can determine only the equality constraints corresponding to the assigned role of the aircraft 40, while avoiding influence of unnecessary equality constraints.

The following formula (24) indicates the integrated inequality constraint (hereinafter referred to as "integrated inequality constraint $g_{INT}$").
{Expression 24}

$$g_{INT}: g_{B\,\#1,R\,\#1}^{SHT} - (1-\delta_{11}) \cdot M \leq 0, g_{B\,\#1,R\,\#1}^{SNS} - (1-\delta_{21}) \cdot M \leq 0$$

$$g_{B\,\#1,R\,\#2}^{SHT} - (1-\delta_{31}) \cdot M \leq 0, g_{B\,\#1,R\,\#2}^{SNS} - (1-\delta_{41}) \cdot M \leq 0$$

$$g_{B\,\#2,R\,\#1}^{SHT} - (1-\delta_{12}) \cdot M \leq 0, g_{B\,\#2,R\,\#1}^{SNS} - (1-\delta_{22}) \cdot M \leq 0$$

$$g_{B\,\#2,R\,\#2}^{SHT} - (1-\delta_{32}) \cdot M \leq 0, g_{B\,\#2,R\,\#2}^{SNS} - (1-\delta_{42}) \cdot M \leq 0$$

$$g_{B\,\#1}^{com} \leq 0, g_{B\,\#2}^{com} \leq 0$$

$$g_{B\,\#1\,\&\,B\,\#2}^{com} \leq 0 \quad (24)$$

In the integrated inequality constraint $b_{INT}$, the indicator variable $\delta_{ij}$ is assigned such that the inequality holds if the inequality constraint is set to 0. Specifically, as shown in formula (24), a term "$(1-\delta_{ij}) \cdot M$" is assigned to every inequality constraint, and this term is subtracted from the value of g. M is a positive integer sufficiently larger than the assumed value of g. Then, when determining the validity of the integrated inequality constraint $g_{INT}$, the indicator variable $\delta_{ij}$ of all of the inequality constraints are set to 1 or 0.

That is, since the indicator variable $\delta_{ij}$ of the inequality constraint corresponding to the role of the aircraft 40 is set to 1, the value of the above-mentioned term is 0, and the term has no influence. On the other hand, the indicator variable $\delta_{ij}$ of an unnecessary inequality constraint that does not correspond to the role of the aircraft 40 is set to 0. Hence, the above-mentioned term is a large integer, so that the inequality always holds, and the integrated inequality constraint $g_{INT}$ is not affected. Accordingly, the integrated inequality constraint $g_{INT}$ can determine only the inequality constraints corresponding to the assigned role of the aircraft 40, while avoiding influence of unnecessary inequality constraints.

Figure 13:
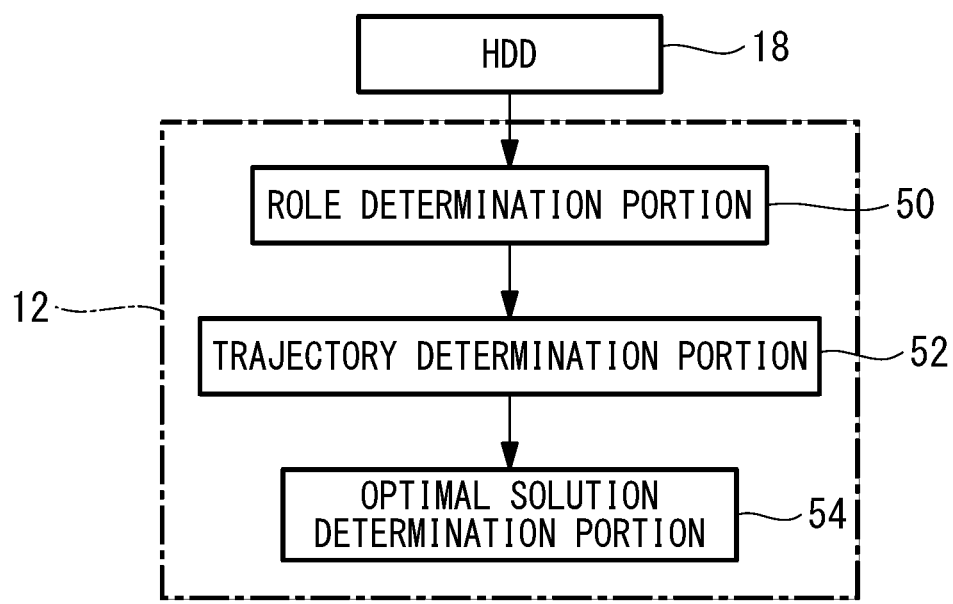
FIG. 13 is a functional block diagram of the aircraft control device of the embodiment of the present invention.

FIG. 13 is a functional block diagram related to joint optimization (hereinafter referred to as "role-trajectory optimization processing") of the role and trajectory of the aircraft 40, of the aircraft control device 10 of the embodiment.

The CPU 12 executes programs previously stored in the HDD 18 to exert functions of a role determination portion 50, a trajectory determination portion 52, and an optimal solution determination portion 54. The HDD 18 also stores the aforementioned integrated objective function $J_{INT}$, integrated equality constraint $h_{INT}$, and integrated inequality constraint $g_{INT}$.

The role determination portion 50 determines the role of the aircraft 40.

Specifically, the role determination portion 50 reads the integrated objective function $J_{INT}$, the integrated equality constraint $h_{INT}$, and the integrated inequality constraint $g_{INT}$ from the HDD 18, and sets the indicator variable $\delta_{ij}$ of the integrated objective function $J_{INT}$, integrated equality constraint $h_{INT}$, and integrated inequality constraint $g_{INT}$ to 1 or 0, depending on the assigned role of the aircraft 40.

The trajectory determination portion 52 calculates the optimal trajectory corresponding to the role of the aircraft 40, by performing optimal trajectory calculation illustrated in FIG. 7 by use of the integrated objective function $J_{INT}$, integrated equality constraint $h_{INT}$, and integrated inequality constraint $g_{INT}$ of which indicator variables $\delta_{ij}$ are set to 1 or 0 by the role determination portion 50.

The role determination portion 50 varies the indicator variable $\delta_{ij}$ to vary the role assigned to the aircraft 40. Then, the trajectory determination portion 52 calculates the optimal trajectory corresponding to the role of the aircraft 40, every time the assigned role of the aircraft 40 changes.

The optimal solution determination portion 54 selects, from among multiple trajectories calculated for each role assigned to the aircraft 40, a role and trajectory that minimize the integrated objective function as the optimal role and optimal trajectory, and settles them as the role and trajectory to be actually assigned to the aircraft 40.

Thus, the role and trajectory of the aircraft 40 are optimized concurrently.

In role-trajectory optimization processing, the role of the aircraft 40 is varied by using evolutionary computation such as a genetic algorithm or the branch and bound method, and the optimal trajectory is calculated by solving DCNLP inside the loop.

In this example, the aircraft control device 10 is installed in all of the aircraft 40 that is member of a flight. However, a predetermined accompanying aircraft (e.g., leader aircraft) may perform role-trajectory optimization processing to determine the role and trajectory of the accompanying aircraft, and may transmit the determined role and trajectory as role-trajectory information to the accompanying aircraft, for example. The role-trajectory information transmitted to the accompanying aircraft may be displayed on the MFD of the accompanying aircraft, and the pilot of the accompanying aircraft may fly according to the displayed information.

As has bees described, the aircraft control device 10 of the embodiment: calculates N nodes indicating a trajectory by substituting a discretized control variable of the aircraft 40 into an equation of motion of the aircraft 40, or sets N nodes indicating a trajectory by another appropriate method; and determines, for each set of adjacent nodes, an optimal trajectory based on an evaluation value obtained from as objective function corresponding to a role of the aircraft 40, from among trajectories that satisfy a constraint that a deviation between the following node and the appropriate following node is 0, and a constraint corresponding to the role.

Thus, the aircraft control device 10 uses a calculation method in which the optimal solution is obtained by discretizing a continuous variable. Hence, a more optimal trajectory corresponding to the role of the aircraft 40 can be calculated in a shorter time.

The aircraft control device 10 also assigns an indicator variable to each objective function and constraint corresponding to the role, and determines a value of the indicator variable for every objective function and every constraint, such that an objective function and constraint that do not correspond to the assigned role of the aircraft 40 are invalidated.

Accordingly, the aircraft control device 10 can concurrently determine the optimal role and trajectory of the aircraft 40, by calculating the trajectory of the aircraft 40 and evaluating the result, every time the role of the aircraft 40, that is, the invalidated objective function and constraint are varied.

Although the present invention has been described by use of the above embodiment, the technical scope of the invention is not limited to the scope described in the above embodiment. Various changes and modifications can be made in the embodiment without departing from the scope of the invention, and the modes including the changes and modifications are also included in the technical scope of the invention. The embodiments may be combined appropriately.

For example, although the embodiment describes a mode in which the aircraft 40 performs role-trajectory optimization processing, the invention is not limited to this. Instead, the processing may be divided among all aircraft 40 that is member of a flight. Alternately, the processing may be performed by a ground facility receiving various information from the aircraft 40, and the determined role and trajectory of the aircraft 40 may be transmitted to each of the aircraft 40.

The flow of processing of the optimal trajectory calculation and role-trajectory optimization processing described in the above embodiment are also an example, and unnecessary steps may be omitted, different steps may be added, or the order may be changed, without departing from the scope of the present invention.

REFERENCE SIGNS LIST 10 aircraft control device
40 aircraft
42 target aircraft
44 guided missile
50 role determination portion
52 trajectory determination portion

The invention claimed is:

1. An aircraft control device that calculates trajectories of a plurality of aircrafts that are members of a flight, by using a calculation method in which an optimal solution is obtained by discretizing a continuous variable, the aircraft control device comprising:
   at least one memory configured to store a program; and
   at least one processor configured to execute the program and control the aircraft control device to:
   assign a variable to each of an objective function and a constraint corresponding to each of a plurality of roles, the objective function and the constraint being used for determining an optimal trajectory of an aircraft,
   determine one role of the plurality of roles for the aircraft,
   determine a value of the variable for every objective function and every constraint, such that an objective function and a constraint that do not correspond to the determined role of the aircraft are invalidated and not used for determining the optimal trajectory of the aircraft,
   calculate discrete points indicating a trajectory of the aircraft by substituting a discretized control variable of the aircraft into an equation of motion of the aircraft, and
   determine, from among the trajectories that satisfy the constraint corresponding to the role of the aircraft, an optimal trajectory based on an evaluation value obtained by the objective function corresponding to the role of the aircraft,
   wherein an optimal role and trajectory of the aircraft are determined concurrently, and
   wherein each of the plurality of roles relates to an action taken by an aircraft that is a member of the flight with respect to a target aircraft.

2. The aircraft control device according to claim 1, wherein the variable is any one of 1 and 0.

3. The aircraft control device according to claim 2, wherein
   the objective function and the constraint configured of an equation are multiplied by the variable.

4. The aircraft control device according to claim 2, wherein
the variable is assigned such that if the variable of the constraint configured of an inequality is set to 0, the inequality holds.

5. The aircraft control device according to claim 1, wherein
the objective function includes a function for calculating a distance between the aircraft and a target.

6. The aircraft control device according to claim 1, wherein
if a role of the aircraft is searching and tracking of a target, the constraint is to constantly acquire and track the target within a coverage area of a radar.

7. The aircraft control device according to claim 1, wherein
if a role of the aircraft is guiding of a guided missile, the constraint is to constantly acquire and track a target within a coverage area of a guidance radio wave.

8. The aircraft control device according to claim 1, wherein
if a role of the aircraft is shooting of a guided missile, the constraint is that a nose of the aircraft is pointed toward a target when the guided missile is shot, and that the target is within a range of the guided missile when the guided missile is shot.

9. An aircraft comprising the aircraft control device according to claim 1.

10. A method for computing aircraft trajectory that calculates trajectories of a plurality of aircrafts that are members of a flight, by using a calculation method in which an optimal solution is obtained by discretizing a continuous variable, comprising the steps of:
assigning a variable to each of an objective function and a constraint corresponding to each of a plurality of roles, the objective function and the constraint being used for determining an optimal trajectory of an aircraft,
determining a role of the plurality of roles for the aircraft,
determining a value of the variable for every objective function and every constraint, such that an objective function and a constraint that do not correspond to the determined role of the aircraft are invalidated and not used by determining the optimal trajectory of the aircraft,
calculating discrete points indicating a trajectory of the aircraft by substituting a discretized control variable of the aircraft into an equation of motion of the aircraft, and
determining, from among the trajectories that satisfy the constraint corresponding to the role of the aircraft, an optimal trajectory based on an evaluation value obtained by the objective function corresponding to the role of the aircraft,
wherein an optimal role and trajectory of the aircraft are determined concurrently, and
wherein each of the plurality of roles relates to an action taken by an aircraft that is a member of the flight with respect to a target aircraft.

* * * * *